US012620186B2

(12) United States Patent
Potetsianakis et al.

(10) Patent No.: US 12,620,186 B2
(45) Date of Patent: May 5, 2026

(54) AUGMENTING VIDEO OR EXTERNAL ENVIRONMENT WITH 3D GRAPHICS

(71) Applicants:Koninklijke KPN N.V., Rotterdam (NL); Nederlandse Organisatie Voor Toegepast-Natuurwetenschappelijk Onderzoek TNO, 's-Gravenhage (NL)

(72) Inventors: Emmanouil Potetsianakis, The Hague (NL); Aschwin Steven Reinier Brandt, The Hague (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 185 days.

(21) Appl. No.: 18/576,211

(22) PCT Filed: Jun. 27, 2022

(86) PCT No.: PCT/EP2022/067618
§ 371 (c)(1),
(2) Date: Jan. 3, 2024

(87) PCT Pub. No.: WO2023/280623
PCT Pub. Date: Jan. 12, 2023

(65) Prior Publication Data
US 2024/0212294 A1 Jun. 27, 2024

(30) Foreign Application Priority Data
Jul. 9, 2021 (EP) ..................................... 21184721

(51) Int. Cl.
*G06T 19/00* (2011.01)
*G06V 10/60* (2022.01)
*H04N 21/81* (2011.01)

(52) U.S. Cl.
CPC ............ *G06T 19/006* (2013.01); *G06V 10/60* (2022.01); *H04N 21/8146* (2013.01)

(58) Field of Classification Search
None
See application file for complete search history.

(56) References Cited

U.S. PATENT DOCUMENTS 9,906,769 B1 * 2/2018 Young .................... H04N 23/90
2016/0379410 A1 * 12/2016 Sharma ................. G06F 16/487
345/633

(Continued)

FOREIGN PATENT DOCUMENTS

AU 2009206251 A1 7/2009
WO 2020209962 A1 10/2020

OTHER PUBLICATIONS

International Search Report and Written Opinion of the International Search Authority for application No. PCT/EP2022/067618 filed Jun. 27, 2022 with mailing date Sep. 30, 2022.

(Continued)

*Primary Examiner* — David H Chu
(74) *Attorney, Agent, or Firm* — Hamilton, Brook, Smith & Reynolds, P.C.

(57) ABSTRACT

A rendering device is provided for rendering a scene, wherein the rendering device is configured to display a video object or allow visual pass-through of an external environment to a viewer and to render the scene as augmentation of the video object or the external environment. The scene may be rendered in a hybrid manner, involving local rendering of a part of the scene by the rendering device and remote rendering of another part of the scene by a remote rendering system. Both the rendering device and the remote rendering system may have access to scene descriptor data which may be indicative of changes in a state of the scene over time. As such, the rendering client may request remote rendering of (Continued)

a part of the scene at a particular temporal state. e.g., to anticipate for network and/or processing latencies.

28 Claims, 5 Drawing Sheets

(56)                References Cited

U.S. PATENT DOCUMENTS

2017/0115488  A1      4/2017  Ambrus et al.
2020/0327740  A1 *  10/2020  Frommhold ............ G06T 19/20
2021/0390928  A1 *  12/2021  Nishibe ................ H04N 13/239

OTHER PUBLICATIONS

European Search Report for EP 21184721.5, dated Nov. 16, 2021.
3GPP; 5G; Extended Reality (XR) in 5G (3GPP TR 26.928 V16.1.0 Release 16) (Jan. 2021).

* cited by examiner

700

710

610 OBTAIN SCENE DESCRIPTOR DATA

620 RECEIVE REQUEST FOR RENDERING

630 RENDER SCENE PART

640 PROVIDE PRERENDERED SCENE DATA

510 OBTAIN SCENE DESCRIPTOR DATA

520 DETERMINE SCENE PART FOR REMOTE RENDERING

530 REQUEST REMOTE RENDERING + PROVIDE TEMPORAL MARKER

540 OBTAIN PRERENDERED SCENE DATA

550 RENDER SCENE

AUGMENTING VIDEO OR EXTERNAL ENVIRONMENT WITH 3D GRAPHICS

This application is the U.S. National Stage of International Application No. PCT/EP2022/067618, filed Jun. 27, 2022, which designates the U.S., published in English, and claims priority under 35 U.S.C. § 119 or 365(c) to European Application No. 21184721.5, filed Jul. 9, 2021. The entire teachings of the above applications are incorporated herein by reference.

TECHNICAL FIELD

The invention relates to a computer-implemented method for rendering a scene using a rendering device, wherein the rendering device is configured to display a video object or allow visual pass-through of an external environment to a viewer and to render the scene as augmentation of the video object or the external environment. The invention further relates to the rendering device and to a remote rendering system and computer-implemented method for rendering part of a scene for the rendering device. The invention further relates to a computer-readable medium comprising data for causing a processor system to perform any of the computer-implemented methods.

BACKGROUND

In Augmented Reality (AR) or Mixed Reality (MR), computer graphics-based 3D objects may be combined with the physical reality perceived by a viewer so as to augment the physical reality for the viewer. For example, a head-worn AR or MR rendering device may visually pass-through the external environment to a viewer, for example via a transparent or semitransparent portion of the rendering device and may be configured to render one or more computer graphics-based 3D objects of a scene and display them in such a way that they are overlaid, mixed, blended or in any other way visually combined with the external environment from the perception of the viewer. Thereby, the outside world may be augmented with digital content, such as informative content (e.g., navigation directions) or entertainment (e.g., game characters), etc.

Such computer graphics-based 3D objects (henceforth also simply referred to as '3D graphics objects') may also be rendered to augment a video-based representation of the physical reality. For example, a head-worn AR/MR rendering device may comprise a forward-facing camera and may record and display the recorded video in real-time or near real-time to a viewer while augmenting the video with rendered 3D graphics objects. Also, other types of videos may be augmented with 3D graphics objects. For example, in Virtual Reality (VR), a so-called panoramic video or omnidirectional video may be augmented with one or more 3D graphics objects.

AR, MR or VR are together also referred to as Extended Reality (XR).

It is known to perform the rendering of 3D graphics objects for XR-augmentation at a user's rendering device, which rendering is in the following also referred to as 'local' rendering. It is also known to perform the rendering at a remote rendering system, which rendering is in the following also referred to as 'remote' rendering.

For example, [1] describes in section 6.2.4 a viewport of a scene being entirely rendered by a XR server. It is said that the XR server generates the XR Media on the fly based on incoming tracking and sensor information, for example a game engine. The generated XR media is provided for the viewport in a 2D format (flattened), encoded and delivered over a 5G network. The tracking and sensor information is delivered in the reverse direction. In the XR device, the media decoders decode the media, and the viewport is directly rendered without using the viewport information.

Remote rendering may address some problems associated with local rendering. For example, if the scene to be rendered is too complex, e.g., requiring more rendering performance than available, or if the rendering device is battery-operated and running low on battery, it may be desirable to have the scene rendered by a remote rendering system, instead of rendering the scene locally. However, remote rendering may be disadvantageous in other situations, for example if network connectivity is poor or if it is desirable to render an object at (ultra-)low latency.

A scene may also be partially rendered by a remote rendering system and partially by a local rendering device, with such rendering being referred to as 'hybrid' or 'split' rendering. For example, [2] describes rendering more complex content such as computer-aided design models on a remote computing system and streaming the rendered models to a client device executing an application that generates and/or displays the models. The client device may augment the remotely rendered content with locally rendered content, such as lightweight, lower-latency content (e.g., user interface/user experience elements, inking, content correlated with a real-world object such as an articulated hand, etc.). The client device also may perform depth-correct blending to provide occlusion relations between remotely- and locally rendered content.

However, [2] assumes the scene to be rendered to be largely static, with the exception of individual objects being manipulatable, in which case the client device may inform the remote rendering system of a manipulation by making use of a scene graph API. This way, the remote rendering system may be informed of an animation or movement of an individual object. This approach, however, is not well-scalable to more dynamic scenes, for example involving more complex animation or movements, appearances of new objects, etc., since the client device needs to continuously inform the remote rendering system of any manipulations of individual objects, which may put a burden on the client device, both computationally and in terms of network allocation.

Another problem of the approach of [2] is its sensitivity to latency, as a manipulation of an object first has to be detected at the client device, data representing the manipulation has to be generated and uploaded to the remote rendering system via the scene graph API, and only after receiving all data remote rendering can start. If the data representing the manipulation is sizable, the upload may thus take a prolonged time, especially if the upload bandwidth to the remote rendering system is limited.

REFERENCES

[1] Extended Reality (XR) in 5G, ETSI TR 26 928 V16.1.0
[2] Hybrid Rendering, WO 2020/209962 A1

SUMMARY

It may be desirable to enable hybrid rendering of a dynamic scene which addresses one or more of the above-mentioned problems.

In a first aspect of the invention, a computer-implemented method is provided for rendering a scene using a rendering device. The rendering device may be configured to display a video object or allow visual pass-through of an external environment to a viewer and to render the scene as augmentation of the video object or the external environment. The method may comprise:

obtaining scene descriptor data, wherein the scene descriptor data may identify a set of 3D graphics objects representing at least part of the scene, wherein the scene descriptor data may be indicative of changes in a state of the scene over time;

based on at least the scene descriptor data, determining a first part of the scene to be rendered locally by the rendering device and a second part of the scene to be rendered remotely;

requesting a remote rendering system having access to the scene descriptor data to render the second part of the scene to obtain prerendered scene data comprising a prerendered version of the second part of the scene, wherein the requesting may comprise providing a temporal marker to the remote rendering system to request the remote rendering system to render the second part of the scene at the state corresponding to the temporal marker;

obtaining the prerendered scene data from the remote rendering system;

rendering the scene as the augmentation of the video object or the external environment, wherein the rendering may comprise locally rendering the first part of the scene and including the prerendered version of the second part of the scene.

In a further aspect of the invention, a rendering device is provided. The rendering device may be configured to display a video object or allow visual pass-through of an external environment to a viewer and to render a scene comprising 3D graphics objects as augmentation of the video object or the external environment. The rendering device may comprise:

a network interface to a network;

a data storage comprising scene descriptor data, wherein the scene descriptor data may identify a set of 3D graphics objects representing at least part of the scene, wherein the scene descriptor data may be indicative of changes in a state of the scene over time;

a processor subsystem which may be configured to:

based on at least the scene descriptor data, determine a first part of the scene to be rendered locally by the rendering device and a second part of the scene to be rendered remotely;

via the network interface, request a remote rendering system having access to the scene descriptor data to render the second part of the scene to obtain prerendered scene data comprising a pre-rendered version of the second part of the scene, wherein said requesting may comprise providing a temporal marker to the remote rendering system to request the remote rendering system to render the second part of the scene at the state corresponding to the temporal marker;

via the network interface, receiving the prerendered scene data from the remote rendering system;

rendering the scene as the augmentation of the video object or the external environment, wherein the rendering may comprise locally rendering the first part of the scene and including the prerendered version of the second part of the scene.

In a further aspect of the invention, a computer-implemented method is provided for rendering part of a scene for a rendering device. The rendering device may be configured to display a video object or allow visual pass-through of an external environment to a viewer and to render the scene as augmentation of the video object or the external environment. The method may comprise:

obtaining scene descriptor data, wherein the scene descriptor data may identify a set of 3D graphics objects representing at least part of the scene, wherein the scene descriptor data is indicative of changes in a state of the scene over time;

receiving a request to render part of the scene, wherein the request may comprise a temporal marker;

based on the scene descriptor data and the request, rendering the part of the scene at the state corresponding to the temporal marker to obtain prerendered scene data comprising a prerendered version of the part of the scene;

providing the prerendered scene data to the rendering device.

In a further aspect of the invention, a rendering system is provided. The rendering system may comprise:

a network interface to a network;

a data storage comprising scene descriptor data, wherein the scene descriptor data may identify a set of 3D graphics objects representing at least part of the scene, wherein the scene descriptor data may be indicative of changes in a state of the scene over time;

a processor subsystem which may be configured to:

via the network interface, receive a request to render part of the scene, wherein the request may comprise a temporal marker;

based on the scene descriptor data and the request, render the part of the scene at the state corresponding to the temporal marker to obtain prerendered scene data comprising a prerendered version of the part of the scene;

via the network interface, provide the prerendered scene data to the rendering device.

In a further aspect of the invention, a transitory or non-transitory computer-readable medium is provided comprising data representing a computer program, the computer program comprising instructions for causing a processor system to perform any given computer-implemented method described in this specification.

The above measures involve characterizing a scene to be rendered using scene descriptor data. In particular, the scene descriptor data may identify 3D graphics objects which are part of the scene, for example by listing object identifiers on which basis the 3D graphics data of the 3D graphics objects can be retrieved, or by comprising the 3D graphics data itself which defines the 3D graphics objects. In other words, the scene descriptor data may comprise (external) references to 3D graphics data of the objects, or may contain such 3D graphics data in embedded form. Such 3D graphics data may for example take the form of mesh data defining one or more polygon meshes of the object. It will be appreciated, however, that the 3D graphics objects may also be defined in other ways, for example using voxels or point clouds. In general, such 3D graphics objects may combined, e.g., during or after rendering, with 2D graphics, for example with images or video, e.g., for textures, backgrounds, etc.

The scene descriptor data may also characterize various other aspects of the scene, for example the relative positions and orientations of objects, the appearance of objects, etc. For example, if an object is animated, the scene descriptor data may define the animation of the object in the form of keyframe animation data or by defining the animation of the object using one or more transformations.

The scene descriptor data may further define a state of the scene over time. Thereby, the scene descriptor data may define how the scene, or parts thereof, change over time. As such, by way of the scene descriptor data, dynamism of the scene may at least in part be defined by the scene descriptor data. Such dynamism may involve changes in the scene which may be 'scripted' or in any other way predefined by way of the scene descriptor data. It will be appreciated that the scene may additionally or alternatively comprise non-scripted changes, e.g., due to user interaction with objects in the scene or due to changes based on external events. In some examples, also such non-scripted changes to the scene may be represented in the scene descriptor data, for example by intermediate updates to, or revisions of, the scene descriptor data.

The scene descriptor data may be made available to a rendering device and a remote rendering system. The rendering device may represent a 'local' rendering device, in that it may be used by an end-user and/or comprise or be connected to a display on which the rendered scene is displayed. In particular, the rendering device may display the rendered scene as augmentation of a video object or of an external environment. Here, the term 'video object' may refer to a virtual object representing the video, which may simply be a 2D overlay surface or the like, but which may, when the video is displayed in a 3D environment, also be any other type of object, e.g., an interior of a sphere on which an omnidirectional video is shown. Furthermore, the term 'external environment' may refer to a part of the physical reality, and in particular to the surroundings of the viewer and/or the rendering device. To augment such an external environment, the rendering device may comprise means to, in the eyes of a viewer, overlay the rendered scene over the external environment, for example using a semi-transparent display or any other type of display suitable for AR or MR rendering.

The rendering device may, based on the scene descriptor data, determine which part of the scene can be rendered locally. Such local rendering may involve the rendering device rendering the part of the scene in real-time or near real-time using known rendering techniques, such as rasterization or raytracing in case of polygon mesh-based 3D graphics objects, for example using its CPU(s) and/or GPU (s). The part of the scene to be rendered locally, which may also be referred to as a 'first' part of the scene, may for example be identified by identifying the object(s) to be rendered locally, for example by referring to object identifiers listed in the scene descriptor data. In addition, the rendering device may determine a part of the scene to be rendered remotely, which part may also be referred to as a 'second' part. The decision to have a part of the scene rendered remotely, and the decision which part is to be rendered remotely, may be taken by the rendering device based on various information, such as a complexity of a 3D graphics object, a computational load of the rendering device, etc.

Having determined a part of the scene to be rendered remotely, the remote rendering system may be requested to render said part. This may involve sending a request to the remote rendering system via a network. The remote rendering system may also have access to the scene descriptor data. For example, the remote rendering system may represent a 'server' from which the rendering device acting as a client may have retrieved the scene descriptor data. Another example is that both the rendering device and the remote rendering system may have retrieved the scene descriptor data from yet another system or server. In particular, the scene descriptor data may be accessible to both the rendering device and the remote rendering system at a start of a rendering session during which the scene is to be rendered by the rendering device. Accordingly, it may suffice for the rendering device to refer to parts of the scene descriptor data in its request to render part of the scene remotely. In other words, it may not be needed for the rendering device to upload mesh data of 3D graphics objects or the like to the remote rendering system when requesting the remote rendering. Rather, the request may, for example, refer to object identifiers or object locations listed in the scene descriptor data so as to identify the part of the scene to be rendered remotely.

In response, the remote rendering system may render the part of the scene using known rendering techniques, such as rasterization or raytracing, and using its CPU(s) and/or GPU(s), to obtain a rendered version of the part of the scene. Such a rendered version may take various forms, such as an image or a video, which may be represented in 2D, in volumetric 3D, in stereoscopic 3D, as a point-cloud, etc., and which image or video may be transmitted in an encoded, and optionally compressed form, to the rendering device via the network. In some examples, the rendered version may also take another form besides an image or video, such as an intermediary rendering result representing the output of one or more steps of a rendering pipeline.

The transmitted rendered scene data may also be referred to as 'prerendered' scene data since it, from the perspective of the rendering device, may represent a prerendered version of the part of the scene, meaning that it may not be needed for the rendering device itself to perform the respective rendering step(s). However, it is not precluded that the rendering device performs further rendering steps. In general, when the rendering of a part of the scene requires one or more rendering steps to be performed, the remote rendering may involve at least one of these rendering steps being performed remotely by the remote rendering system.

Having received the prerendered scene data, the rendering device may render the scene as the augmentation of the video object or the external environment, using on the one hand the locally rendered version of the first part of the scene and on the other hand the remotely rendered version of the second part of the scene. Both rendered versions may be combined in various ways, for example by blending or compositing or the like. In some examples, the rendering device may use a rendering pipeline to render the scene, in which the prerendered scene data may bypass at least an initial part of the rendering pipeline to be processed by a later part of the rendering pipeline. In another example, the prerendered scene data may fully bypass the rendering pipeline, to be combined with the locally rendered scene data afterwards.

As already indicated above, the scene may be a dynamic scene, in that the scene descriptor data may at least in part define how the scene changes over time. To ensure or at least enable that the remote rendering system renders the second part of the scene at a temporal state of the scene which matches the temporal state of the scene rendered by the rendering device, the remote rendering system may be requested to render the second part of the scene at a suitable time instance. Here, the term 'temporal state' may refer to a state of the scene at a particular point in time. For that purpose, a temporal marker may be provided to the remote rendering system. The temporal marker may for example be a timestamp or any other direct or indirect representation of the time instance for which rendering is desired. The remote rendering system may, by having access to the scene descriptor data, identify the state of the scene at the indicated time instance, and may render the second part of the scene accordingly. For example, if a particular 3D graphics object is positioned, oriented, and/or assumes a particular pose at the requested time instance, the remote rendering system may render the 3D graphics object accordingly.

The above measures may be based on the insight that for dynamic scenes the hybrid rendering between rendering device and remote rendering system should be synchronized. There may be various ways of doing so. For example, as in [2], the rendering device may maintain a state of the scene and signal changes to the state, e.g., based on use interaction, to the remote rendering system. As elucidated in the background section, however, this may be insufficiently suitable for dynamic scenes. In accordance with the above measures, if a remote rendering of a part of the scene is requested, the temporal state at which the scene is to be rendered may be indicated. This indication of the temporal state, e.g., in form of a temporal marker, may suffice since the remote rendering system may already be provided with the scene descriptor data indicating the changes in the scene over time, for example before a start of the rendering session. This way, relatively little information needs to be provided to the remote rendering system, which reduces bandwidth requirements and/or transmission time. The above measures may also be more robust against interruptions in network connectivity. For example, if a request for remote rendering is lost due to such interruptions, a next request may again be handled normally, whereas in the example of [2], a loss of a request may result in the state of the scene having become desynchronized between the remote rendering system and the rendering device, as the request may have contained an update to an object. Yet a further advantage may be that the time instance for which the second part of the scene is to be rendered may be suitably selected, e.g., in the future, so that the prerendered scene data received by the rendering device may be seamlessly combined with the local rendering output.

The following embodiments may represent embodiments of the computer-implemented method for rendering the scene using the rendering device but may also represent embodiments of the rendering device where its processor subsystem is configured to perform corresponding method step(s). Unless otherwise precluded for technical reasons, these embodiments may also indicate corresponding embodiments of the computer-implemented method for rendering part of a scene for the rendering device and of the remote rendering system and its processor subsystem.

In an embodiment, the scene descriptor data may describe the state of the scene at a plurality of time instances on a scene timeline to indicate the changes in the state of the scene over time, and wherein the temporal marker may be indicative of a time instance on the scene timeline. The changes in the scene may thus be linked to a scene timeline, for example by defining that a particular change occurs at one point on the scene timeline, e.g., at a first-time instance, while another change may occur at another point on the scene timeline, e.g., at a second time instance. The scene timeline may for example be defined by the scene descriptor data itself or may otherwise be commonly known by the rendering device and the remote rendering system and thus provide a common reference for remote rendering requests. It may thus be avoided that a request from the rendering device pertaining to a first temporal state of the scene may be erroneously translated by the remote rendering system to a second temporal state of the scene due to a lack of common reference. The scene timeline itself may for be expressed in any suitable form, including but not limited to a timeline expressed in milliseconds, seconds, minutes, etc., or in relation to time instances of any other reference clock. In particular, the scene timeline may be defined in relation to a real-time rendering of the scene, in that it may be known how long a time interval on the scene timeline should take when rendering the scene in real-time.

In an embodiment, the 3D graphics objects to be rendered may be accompanying or complementary to video content. In such cases, the timeline of the scene may at least in in part be temporally aligned with or refer to a timeline of the video content. This may for example be achieved by either describing the scene updates with reference to a video decoding or playback timestamp, or by controlling the video playback based on the scene updates. The requests and responses for prerendered scene data may use the video timestamps for synchronization.

In an embodiment, the scene descriptor data may be indicative of at least one of: a presence, a position, an orientation, and an appearance, of a respective object, in the scene over time. A scene may change in various ways, including but not limited to objects appearing or disappearing from the scene, the position of individual objects or parts of such objects changing, the orientation of individual objects or parts of such objects changing, and changes in how objects appear in the scene, e.g., their pose or other exterior attributes. In general, such changes may be defined by defining changes in object or scene properties or by defining object or scene properties anew for particular time instances. The scene descriptor data may define such changes directly, e.g., by defining a change in a property or by defining a new value of a property, or indirectly. An example of the latter is the scene descriptor data containing references to different versions of the scene for respective different time instances, with such versions of the scene being defined elsewhere, e.g., by scene data defining each version of the scene, etc. The scene descriptor data may link to such scene data.

In an embodiment, the method may further comprise determining the temporal marker to indicate a second time instance which is ahead in time of a first time instance at which the rendering device currently renders the scene. By being able to indicate the time instance for which the second part of the scene is to be remotely rendered by the remote rendering system, the rendering device may request the second part of the scene be rendered for a time instance which is ahead in time of a time instance at which the scene is currently rendered by the rendering device. This may enable the rendering device to anticipate that it may receive the requested prerendered scene data only with a delay, e.g., due to delays in the network or in processing. This way, the need for techniques such as late-stage reprojection may be reduced or avoided, which otherwise may have to be used to compensate for such delays by transforming a scene which is rendered for a past time instance to a current time instance, and which may be computationally complex and introduce artifacts.

In an embodiment, the method may further comprise determining the temporal marker based on at least one of:
- a network latency of a network between the rendering device and the remote rendering system;
- a latency of, or scheduling constraints associated with, the rendering of the second part of the scene by the remote rendering system.

The time instance for which the second part of the scene is to be rendered by the remote rendering system may be chosen to specifically account for various delays in the network and/or processing. Such delays may for example be measured or estimated, e.g., by the rendering device, and the temporal marker may be generated to compensate for such delay(s) by requesting the second part of the scene to be rendered for a time instance which is ahead of the current time instance at which the scene is rendered by the time corresponding to said delay(s). In some embodiments, the temporal marker may be generated to account for the measured and/or estimated delay(s) while additionally adding a safety margin, e.g., to account for various smaller or unknown delays. By determining the temporal marker based on such estimated and/or measured delay(s), it may be avoided that the rendered scene data arrives too late, which may necessitate the use of techniques such as late-stage reprojection as discussed above, or significantly too early, which may require prolonged buffering, and which may reduce the ability to allow for sudden and dynamic changes in the scene.

It is noted that any request to render a part of a scene at a time instance, which may for example be ahead in time of a current time instance at which the rendering device currently renders the scene, may be generated internally by the remote rendering system, for example as a result of the remote rendering system predicting a need for remote rendering assistance for the rendering client. Such predictions may for example be based on historical data of past requests of the rendering device, or based on current request(s) of the rendering device.

In an embodiment, the scene descriptor data may comprise object identifiers of respective ones of the set of 3D graphics objects, wherein:

the requesting the remote rendering system may comprise providing respective object identifiers of one or more 3D graphics objects representing the second part of the scene to the remote rendering system; and/or the receiving of the prerendered scene data may comprise receiving metadata comprising respective object identifiers of one or more 3D graphics objects which are prerendered in the prerendered scene data.

By providing object identifiers of respective ones of the set of 3D graphics objects as part of the scene descriptor data, the rendering device may request rendering of a (second) part of a scene by simply providing the corresponding object identifiers to the remote rendering system. This way, relatively little information needs to be provided to the remote rendering system, which reduces bandwidth requirements and/or transmission time. In addition, or alternatively, the remote rendering system may provide metadata with the prerendered scene data, which metadata may comprise respective object identifiers of one or more 3D graphics objects which are prerendered in the prerendered scene data. This may inform the rendering device which rendered objects are contained in the prerendered scene data and may be advantageous if for example fewer rendered objects are contained in the prerendered scene data than requested. For example, the remote rendering system may be unable to render all requested objects, e.g., due to computational limitations. The rendering device may be informed thereof by way of the metadata, and may, if an object identifier is missing from the metadata, cover this omission by locally rendering the respective object. This may allow for unforeseen changes or deficiencies in the remote rendering by the remote rendering system to be accommodated by the rendering device. This may be particularly advantageous if the prerendered scene data contains, or may in principle contain, several rendered objects. In such cases, it may be desirable to know which objects are rendered in the prerendered scene data and which are not, and which may otherwise not be easily determinable from the prerendered scene data itself.

In an embodiment, the metadata may be received repeatedly by the rendering device, and wherein the method may further comprise stopping or starting a local rendering of a 3D graphical object based on an object identifier of the 3D graphical object appearing in or disappearing from the metadata. The remote rendering system may provide metadata on a periodic or semi-periodic or otherwise repeated basis, for example as a metadata stream accompanying a video stream of the prerendered scene data. By monitoring the metadata to detect object identifiers appearing or disappearing from the metadata, the rendering device may detect when and which object is rendered in the prerendered scene data, and may adapt its local rendering accordingly, for example by starting to locally render an object if the object disappears from the prerendered scene data, or stopping such local rendering, etc.

In an embodiment, the rendering of the scene may be adaptable to a content of the video object or of the external environment, and wherein the method may further comprise determining content data which at least in part characterizes the content and providing the content data to the remote rendering system. The rendering of the scene may be adapted to a content of the video object or the external environment to be augmented. Such adaptation may for example improve the realism of the augmentation so as to convey the impression that the objects in the scene belong to the content of the video object or the external environment. A specific example may be the following: the scene may be rendered as an augmentation of an outdoor environment at sunset. The scene may be rendered to simulate this sunset setting, for example by adding a directional light source at a suitable position in the scene and selecting the color temperature of the light source to match the sunset. The properties of the content of the video object or the external environment may be available to the rendering device, e.g., on the basis of (sensor) measurements, but may normally not be available to the remote rendering system. To nevertheless enable the remote rendering system to adapt its rendering of a part of the scene to such properties, the rendering device may determine content data which at least in part characterizes the content of the video object or the external environment, e.g., in terms of lighting conditions, and may provide the content data to the remote rendering system to enable the remote rendering of a part of the scene to be adapted to such properties.

In an embodiment, the content data may comprise at least one of:

lighting data characterizing a lighting in the content;

depth data characterizing a depth of the content; and image or video data providing a visual representation of the content.

Accordingly, the rendering device may generate data characterizing the lighting in the content of the video object or the external environment, e.g., in terms of direction, strength, color temperature, etc., and provide this data to the remote rendering system to enable said system to adjust its rendering thereto. Another example is that the rendering device may generate data characterizing a depth of the content, for example in the form of a depth map which may be generated from the content by depth estimation. For example, such depth estimation may be performed using a stereo camera or time-of-flight sensor connected to or integrated into the rendering device. This may enable the remote rendering system to adapt its rendering to the depth of the content to be augmented, e.g., by adjusting a projection matrix of the rendering. Yet another example is that the rendering device may provide a visual representation of the content to the remote rendering system to enable the remote rendering system itself to detect relevant properties of the content. For example, the rendering device may provide a transcoded version of the video object, e.g., in form of a reduced quality version, to the remote rendering system, which reduced quality version may suffice to determine lighting conditions, depth, etc. Yet another example is that the rendering device may capture the external environment with a camera and stream the resulting video to the remote rendering system, e.g., at reduced quality. Yet another example is that the rendering device may capture the external environment with a camera and/or other sensors and may locally perform image recognition to extract features from the captured content and may transmit data characterizing the extracted features to the remote rendering system in the form of content data.

In an embodiment, the determining of the first part of the scene to be rendered locally and the second part of the scene to be rendered remotely may comprise determining whether a 3D graphical object is to be rendered locally or remotely based on at least one of:

a latency, bandwidth or reliability, of a network between the rendering device and the remote rendering system;

a latency, bandwidth or reliability, of a network between the rendering device and a content server, which content server is configured to host 3D graphics data defining the set of 3D graphics objects of the scene;

a computational load of the rendering device;

a computational load of the remote rendering system;

a battery level of the rendering device;

a complexity of the 3D graphical object; and a scene distance between a viewpoint in the scene from which the scene is rendered by the rendering device and the 3D graphical object in the scene.

Various types of information may be considered to determine which part of the scene is to be rendered remotely and which part of the scene is to be rendered locally. It is noted that the decision on which part of the scene is to be rendered where may be taken on a periodic or semi-periodic or repeated basis, for example every second, ten seconds, minute, etc., or if an event is detected, which may enable the rendering device and/or the remote rendering system to react to sudden changes, for example to a computational load suddenly increasing or decreasing, packet loss increasing, etc. This way, it may be ensured or at least facilitated that the rendering device is able to render the scene even if such sudden changes occur.

In an embodiment, the scene descriptor data may comprise a graph comprising branches indicating a hierarchical relation between 3D graphics objects, wherein the determining of the first part of the scene to be rendered locally and the second part of the scene to be rendered remotely may comprise determining per branch whether to render the 3D graphics objects of a respective branch locally or remotely. A graph may be a suitable data representation of relations between objects and/or parts of objects in the scene. For example, objects or object parts may exhibit connectedness in the scene, for example spatial connectedness by being actually connected to each other or by being in each other's vicinity or there being interaction between the objects, etc. Such connectedness may be well-represented as edges in a graph. When rendering the scene, it may be desirable, for example for rendering efficiency or quality, to render such connected objects or object parts by one entity. Accordingly, when determining which part of the scene is to be rendered where, the decision may be taken on a per-branch basis so that such connected objects or object parts are either rendered locally by the rendering device or remotely by the remote rendering system. This may avoid inefficiencies in the rendering or reduced rendering quality. In this respect, it is noted that the scene descriptor data may also indicate hierarchical relations between, one the one hand, a 3D graphics object, and on the other hand, other types of assets, such as textures, audio, etc.

The following embodiments may represent embodiments of the computer-implemented method for rendering part of the scene for the rendering device but may also represent embodiments of the remote rendering system where its processor subsystem is configured to perform corresponding method step(s). Unless otherwise precluded for technical reasons, these embodiments may also indicate corresponding embodiments of the computer-implemented method for rendering the scene using the rendering device and of the rendering device and its processor subsystem.

In an embodiment, the method may further comprise generating metadata comprising respective object identifiers of one or more 3D graphics objects which are prerendered in the prerendered scene data and providing the metadata with the prerendered scene data to the rendering device. As discussed elsewhere, such metadata may enable the rendering device to detect object identifiers appearing or disappearing from the metadata. Accordingly, the rendering device may detect when and which object is rendered in the prerendered scene data, and may adapt its local rendering accordingly, for example by starting to locally render an object if the object disappears from the prerendered scene data, or stopping such local rendering, etc.

In an embodiment, the method may further comprise adjusting the part of the scene which is requested to be rendered by omitting 3D graphics objects from the rendering based on one of:

a computational load of the remote rendering system;

a latency, bandwidth or reliability, of a network between the rendering device and the remote rendering system.

The above measures may enable the remote rendering system to determine whether, and if so, to which degree to assist in the rendering of the scene, which may allow the remote rendering system to take information into account which is not available to the rendering device, such as its own computational load. While the rendering device may request the remote rendering system to render a part of the scene, the remote rendering system may thereby omit one or more objects from the rendering, for example if the computational load of the remote rendering system is too high, or if the network connection to the rendering device is too poor to be able to reliably transmit the resulting prerendered scene data of these objects. The remote rendering system may thus partially, or in some cases fully, refuse the request for remote rendering. In case of a full refusal in which the remote rendering system decides to render none of the requested objects, the remote rendering system may answer the request with a refusal. In case of a partial refusal in which the remote rendering system decides to render only a subset of the requested objects, the remote rendering system may answer the request with a response indicating that only a subset of the requested objects will be rendered, and/or by providing metadata together with the prerendered scene data identifying the objects that have been rendered, thereby implicitly indicating to the rendering device which objects have not been rendered.

It will be appreciated by those skilled in the art that two or more of the above-mentioned embodiments, implementations, and/or aspects of the invention may be combined in any way deemed useful.

Modifications and variations of any one of the systems or devices (e.g., remote rendering system, rendering device, etc.), computer-implemented methods, metadata and/or computer programs, which correspond to the described modifications and variations of another one of these systems or devices, computer-implemented methods, metadata and/or computer programs, or vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
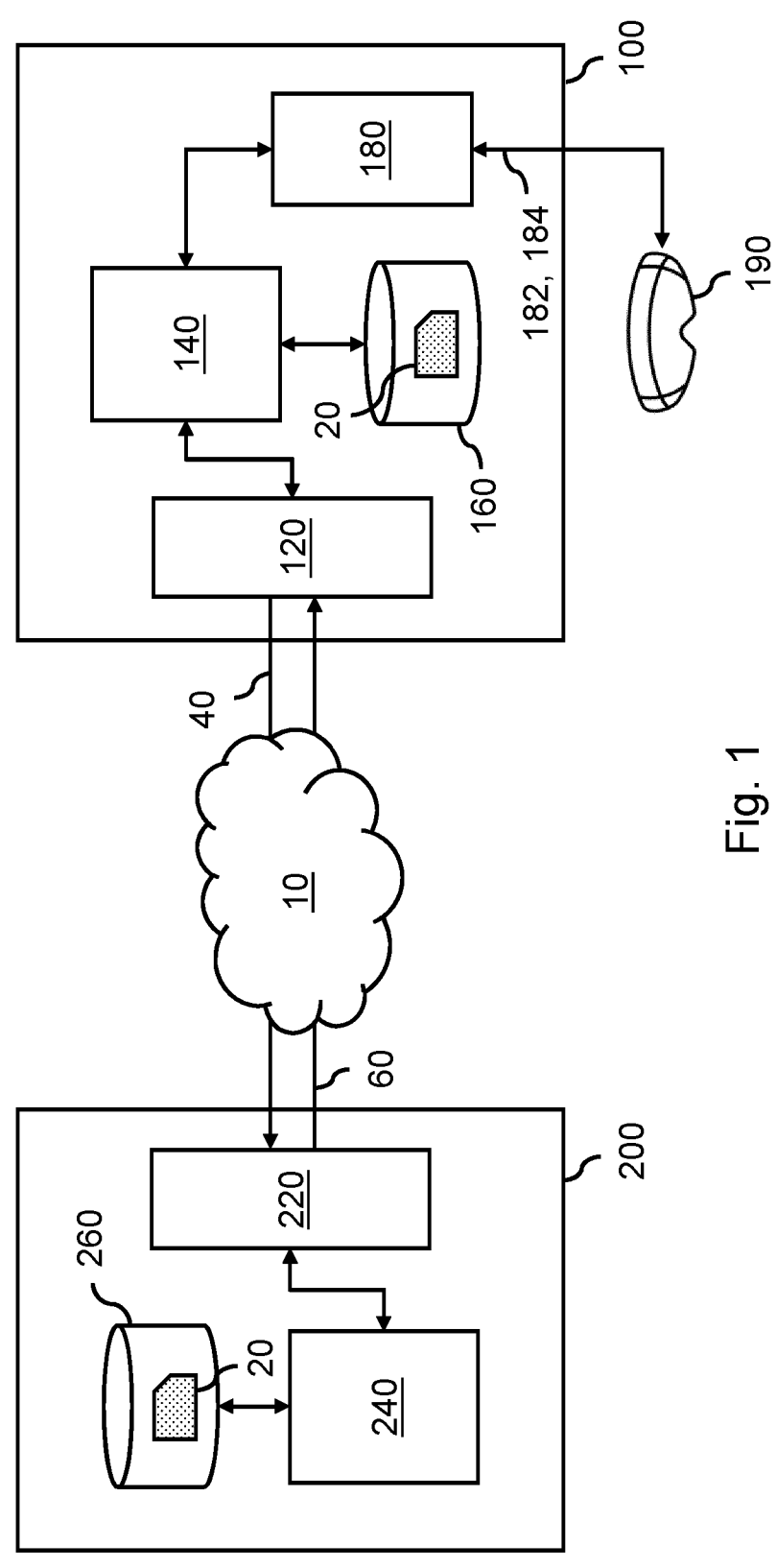
FIG. 1 shows a rendering device configured to request remote rendering of a scene part, and a remote rendering system configured to, in response to the request, render the scene part and provide prerendered scene data to the rendering device.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

10 network
20 scene descriptor data
40 data representation of request
60 prerendered scene data
100 rendering device
120 network interface
140 processor subsystem
160 data storage
180 display interface
182 display data
184 sensor data
190 head-mounted display
200 remote rendering system
220 network interface
240 processor subsystem
260 data storage
300 user
320 head-mounted display
340 external environment
342 field of view
360 part of scene to be rendered locally
380 part of scene to be rendered remotely
400 request render scene part at n+3
410 render scene part at n+3
420 transmit rendered scene data for n+3
430 render scene part at n+3
440 display scene at n+3
510 obtain scene descriptor data
520 determine scene part for remote rendering
530 request remote rendering+provide temporal marker
540 obtain prerendered scene data
550 render scene
610 obtain scene descriptor data
620 receive request for rendering
630 render scene part
640 provide prerendered scene data
700 non-transitory computer-readable medium
710 data
1000 exemplary data processing system
1002 processor
1004 memory element
1006 system bus
1008 local memory
1010 bulk storage device
1012 input device
1014 output device
1016 network adapter
1018 application

DESCRIPTION OF EMBODIMENTS

The following embodiments may relate to rendering a scene using a rendering device, which rendering device may be configured to display a video object or allow visual pass-through of an external environment to a viewer and to render the scene as augmentation of the video object or the external environment.

The scene to be rendered may be defined in various ways. For example, a scene may comprise 3D graphics objects which in turn may be defined by geometric primitives, such as polygons. As is known per se, polygon meshes may for example be defined by vertexes, edges forming connections between vertices, faces, surfaces, materials, UV coordinates, etc. When defining 3D graphics objects as geometric primitives, the rendering of the scene may for example involve rasterization or raytracing, both of which rendering techniques are known per se. The result of such rendering may be a bitmap or any other form of raster graphics, which may be written into a frame buffer for display on a display. It is noted that such 3D graphics objects may also include video, for example in form of a texture applied to a 3D graphics object. In a specific example, a 3D graphics object to be rendered may be a sphere, with the inside of the sphere showing an omnidirectional video. The rendering of a 3D graphics object may thus include rendering a video. In addition, or as an alternative to the use of geometric primitives, 3D graphics objects may also be defined in other ways, for example as point clouds or by voxels, both of which also may be rendered to obtain a bitmap to be displayed.

Rendering may involve various steps. For example, in case the rendering is based on rasterization, individual rendering steps may comprise vertex processing, tessellation, primitive processing, the core rasterization, fragment processing and pixel processing. When referring to the rendering of a scene, such references may refer to all rendering steps but also a subset, e.g., one or more, of such rendering steps. In general, the rendering may be done using one or more CPU(s) and/or GPU(s).

The following embodiments may make use of scene descriptor data for the rendering of the scene. Such scene descriptor data may represent a description of the scene, for example by identifying the 3D graphics objects in the scene. For example, the scene descriptor data may comprise object identifiers for respective objects, while additionally containing or referring to graphics data defining each object. In general, the scene descriptor data may model a spatial geometry of the scene, referring to the spatial relations between objects, e.g., their relative positions and orientations. As is known per se, e.g., from section 4.6.6 of reference [1], a spatial geometry of a scene may be modelled in various ways, for example as a scene graph. For example, a scene graph may be a directed acyclic graph, for example a plain tree-structure which represents an object-based hierarchy of the geometry of a scene. For example, the leaf nodes of the graph may represent geometric primitives such as polygons, for example by comprising identifiers of the geometric primitives. Spatial transformations may be represented as nodes of the graph and represented by a transformation matrix. Other scene graph nodes may represent light sources, particle systems, virtual cameras, etc.

FIG. 1 shows an example of the rendering device, which rendering device 100 may comprise a network interface 120, a processor subsystem 140, a data storage 160 and a display interface 180, with each of said components being described in more detail elsewhere in this specification. The rendering device 100 may access scene descriptor data 20 describing the scene to be rendered and may, based on scene descriptor data 20, determine a first part of the scene to be rendered locally by the rendering device and a second part of the scene to be rendered remotely. For example, the rendering device 100 may determine that one or more objects are to be rendered locally and the remainder remotely, or vice versa, and may request a remote rendering system 200 to render the second part of the scene. For that purpose, the rendering device 100 may send a request 40 to the remote rendering system 200, for example by sending the request 40 via a network interface 120 of the rendering device 100 and via a network 10 connecting the rendering device 100 to the remote rendering system 200 to be received by a network interface 220 of the remote rendering system 200. The remote rendering system 200 may also have access to the scene descriptor data 20, for example by being the host of the scene descriptor data 20 for retrieval by the rendering device 100, or by having retrieved the scene descriptor data 20 from elsewhere. Accordingly, the remote rendering system 200 may render the second part of the scene to obtain prerendered scene data 60 comprising a prerendered version of the second part of the scene and send the prerendered scene data 60 via the network 10 to the rendering device 100. The rendering device 100 may in turn render the scene as the augmentation of the video object or the external environment, namely by locally rendering the first part of the scene and by including the prerendered version of the second part of the scene, for example by blending or otherwise combining the prerendered version of the second part of the scene with the locally rendered first part.

Such hybrid rendering may involve rendering on a frame-by-frame basis, meaning that the rendering device 100 may render the first part of the scene for a given frame, receive the second part of the scene for the given frame as prerendered scene data, combine both rendered scene parts and then display the resulting combined frame. It will be appreciated, however, that the remote rendering may, but does not need to, be requested per frame. For example, the rendering device 100 may request remote rendering to start from a specified time instance and for a specified duration, or for a non-specified duration until the rendering device 100 requests the remote rendering to be stopped, and the remote rendering system 200 may start rendering frames from the specified time instance onwards. The prerendered scene data may then be streamed to the rendering device 100, for example as a video stream. In a specific example, the video stream may be encoded using an adaptive streaming technique, such as but not limited to MPEG DASH (Dynamic Adaptive Streaming over HTTP).

In an example of the FIG. 1 embodiment, the rendering device 100 may represent an AR client, and the following steps, or a subset thereof, may be carried out to effect the hybrid rendering. Here and elsewhere, the rendering device may be simply referred to as 'client' and the remote rendering system as 'rendering server', while the rendering context may be AR, but may also apply to XR in general or to VR.

1. The client may obtain an AR scene descriptor file for a scene to be rendered, e.g., from the rendering server or from a content server hosting assets of the scene. The AR scene descriptor file may be an example of scene descriptor data as described elsewhere in this specification.

2. From the AR scene descriptor file, the client may identify and download 3D assets, e.g., from the rendering server or from the content server. In some examples, the client may download all 3D assets of the scene, while in other examples, the client may download only part of all 3D assets, e.g., only those 3D assets which are visible from a user's viewpoint in the scene.

3. Based on criteria such as the user's position in the scene, available bandwidth between the server and the client, available resources at the server and/or the client, etc., the client may determine which object(s) to render locally and which to have rendered remotely by the rendering server.

4. The client may request the rendering server to render select object(s) and to provide prerendered scene data to the client, e.g., in form of a video stream. In the request, or accompanying the request, the client may include information which may be relevant for the rendering server's rendering of part of the scene, such as information defining a user's viewpoint in the scene, e.g., in form of a viewing position and/or orientation. Additional information may include content data characterizing lighting conditions in the content to be augmented, user preferences, a transcoded version of the video object to be augmented, or a video recording of an outward and/or inward facing camera showing the external environment to be augmented.

5. The client may receive and decode the video stream to obtain a decoded version of the prerendered scene data containing prerendered content.
   a. If the prerendered content still needs to be subjected to further rendering steps before display, such prerendered content may be input to the client's rendering engine but may bypass a number of rendering steps, for example one more initial rendering steps.

b. If the prerendered content represents fully prerendered object(s), its image or video data may be copied to a video buffer for merging after so-called viewport generation by the rendering engine. Such prerendered content may include, but is not limited to:

i. Traditional image or video content (e.g., monoscopic, stereoscopic, multi-view, volumetric and/or omnidirectional)

ii. Render-ready content which may be copied directly to the buffer (e.g., the vertex or fragment buffer for OpenGL). Such prerendered content may for example be in the form of textures, sprites, or any other low-level graphics elements.

iii. Any of the above with processing metadata (transformation matrix, transparency layers, crop/zoom characteristics etc.)

6. The client's rendering engine may create a partial rendered viewport by locally rendering a select number of objects.

7. If some objects are available in a pre-rendered format, the client's rendering engine may merge the partial rendered viewport with the video buffer containing the pre-rendered object(s) to generate a final rendered viewport.

8. The client may again start at step 3 until the end of the AR presentation.

In another example of the FIG. 1 embodiment, the rendering device 100 may represent an XR client, such as a pair of tethered AR glasses, which may be configured to render spatially aligned 3D and 2D assets over an external environment, e.g., over the viewer's physical surroundings. The remote rendering system 200 may act as rendering server to the XR client and may comprise content of the scene to be rendered, including descriptor files, 3D/2D assets representing 3D/2D graphics objects, etc. and as previously described, may have the ability to render part of a scene, e.g., as an omnidirectional frame, encode/transcode, package, and distribute the rendered scene part and any other generated assets. Such a XR client and rendering server may conform to the hybrid-rendering category of section Fout! Verwijzingsbron niet gevonden. of reference [1]. It is also noted that the following references to, and embodiments of the XR client and the rendering server may also apply to any other type of rendering device and any other type of remote rendering system as described in this specification.

During operation, the XR client may retrieve one or more descriptor files that contain information on the scene and the available and/or required assets. The assets themselves may be stored at/by the rendering server or at/by another server, with the latter also being referred elsewhere as a 'content server'. The descriptor files may include, or represent, the scene descriptor data as described elsewhere. Based on the scene descriptor data, the XR client may download those assets which are needed to render the scene. In some embodiments, the XR client may download all assets so as to be able to render the scene offline, e.g., even if network connectivity is interrupted. Alternatively, the assets and descriptor files may be stored on the XR client and uploaded to the rendering server, for example before start of a rendering session.

After parsing the descriptor(s), e.g., as contained in the scene descriptor data, the XR client may select which of the required assets are to be rendered, for example on the basis of criteria such as visibility. The XR client may then decide, from the selected assets, which of these asset(s) is/are to be rendered locally and which remotely. The criteria for the local/remote selection may be multidimensional, e.g., based on geometric complexity, network connectivity, semantic importance, spatial positioning, etc. After this decision is made, the XR client may send a request to have selected assets rendered remotely. Such a request may be constituted by a fetch request to fetch the remotely rendered assets. Concurrently, earlier, or later, the XR client may start rendering select assets locally. The XR client's request may contain information on the rendering context, for example by indicating a virtual camera position, head pose etc., and possibly environmental information captured by sensors located on the client side, such as an ambient light sensor capturing light data, a depth sensor capturing depth data, or an outward facing camera recording an image or video. The rendering server may, on the basis of the received request and associated information, render the requested part of the scene. After rendering, the resulting prerendered scene data may be compressed and sent to the XR client, possibly alongside accompanying information such as synchronization information, transformation matrices, codec properties etc., which accompanying information may be transmitted to the XR client in the form of metadata. When the XR client has received the prerendered scene data and when the locally rendered scene data is available, both types of data may be combined, for example by overlaying or stitching. For that purpose, both types of data may be temporally and spatially aligned, which may be a product of processing, potentially based on the accompanying information received from the rendering server.

The partitioning between assets to be rendered locally and assets to be rendered remotely may be adjusted during a rendering session, e.g., at any time. It may therefore be desirable to keep the scene descriptor data in sync between the XR client and the rendering server. For that purpose, when a scene update occurs, which update may be initiated by the XR client, the rendering server, the content server, or a remote service, for example based on user input or external events, the scene descriptor data at both entities may be updated, for example by transmitting a scene description update ('delta') and optionally new assets associated with the scene description update from one entity to another. Such an update mechanism may also be used if the communication between the rendering server and the XR client is disrupted but subsequently re-established. Alternatively, in case that the scene description update can not be applied, e.g., due to compromised file integrity or expiration, a recent version of the scene description might be requested.

Figure 2:
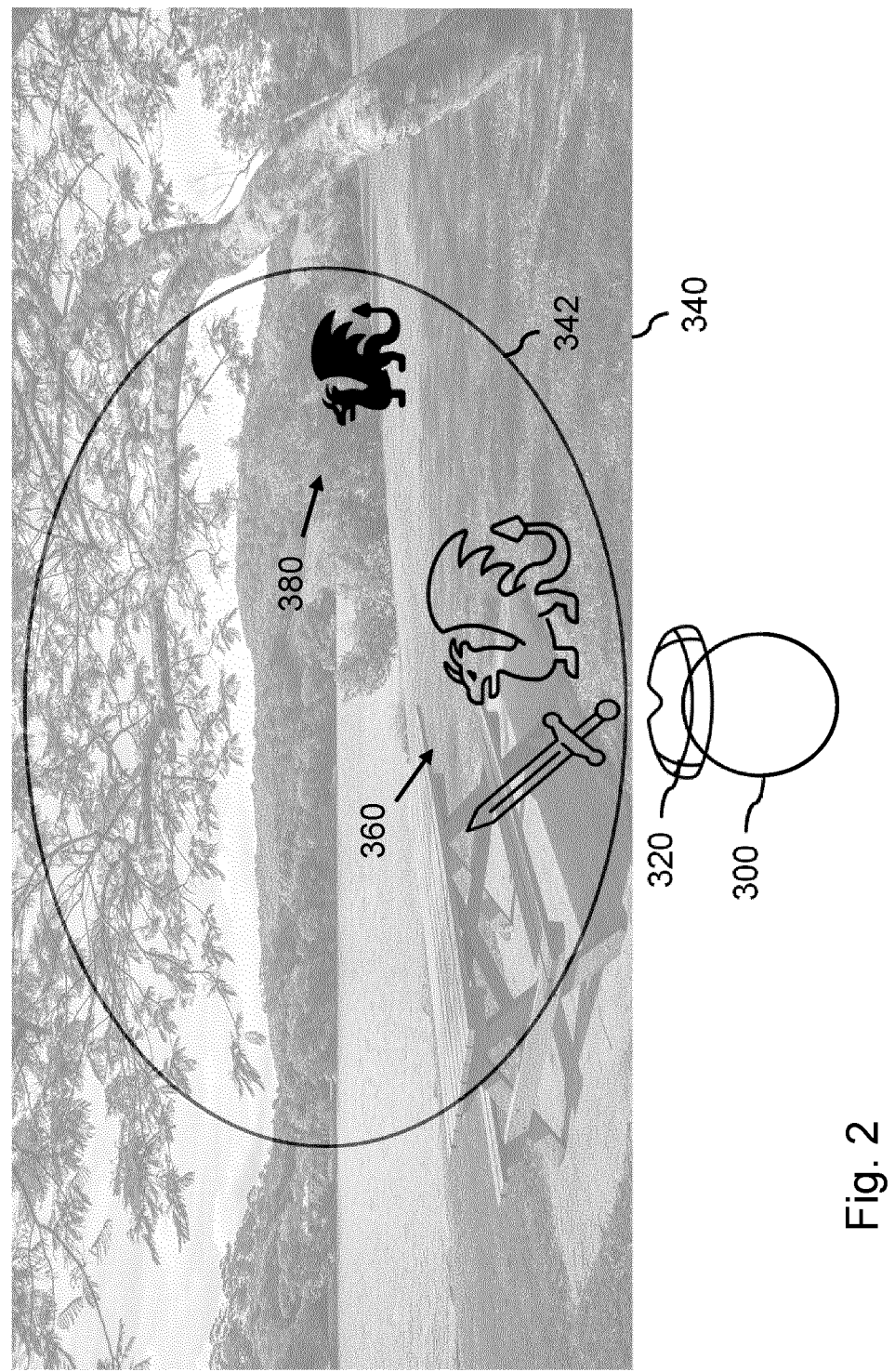
FIG. 2 shows a scene rendered using a head-mounted display to augment an external environment, with a first object in the scene being locally rendered and a second object in the scene being remotely rendered by a remote rendering system.

FIG. 2 shows an example of a scene rendered using a head-mounted display to augment an external environment. Here, a head-mounted display 320 is shown to be worn by a user 300, with the head-mounted display 320 allowing the user 300 to view an external environment 340, for example via a transparent or semi-transparent portion of the head-mounted display 320. The rendering device itself is not shown in FIG. 2 but may in some embodiments be integrated into the head-mounted display 320, which may then also be referred to as head-mounted device, while in other embodiments, the rendering device may be separate from the head-mounted display 320 but connected thereto, e.g., using wired or wireless communication. The rendering device may render a scene to a user to augment the user's view of the external environment 340. Such augmentation may for example take place within a field of view 342 corresponding to the field of view provided by the transparent or semitransparent portion of the head-mounted display 320, or within a sub-portion thereof. As shown in FIG. 2, a first part 360 of the scene may be rendered locally by the rendering device while a second part 380 of the scene may be rendered remotely by the remote rendering system (not shown in FIG. 2). For example, the rendering device may decide to render a 3D graphical object which is to appear nearer to the user locally, for example as the user may interact with the 3D graphical object, which interaction may benefit from a lower latency, while another 3D graphical object which is to appear further from the user may be rendered remotely by the remote rendering system.

Application Example

In general, there may be various application examples of rendering scenes to augment a video object or external environment. While FIG. 2 shows an AR gaming experience in which a user may fight virtual monsters overlaid over the user's actual physical surroundings, there may also be various other types of applications, e.g., in tourism, business, industry, education, etc. One of such examples may be a museum with paintings rendered in AR. For that purpose, a physical museum may comprise empty canvasses onto which paintings may be overlaid in AR by a head-mounted display worn by a user. These paintings may thus represent 3D graphics objects of a scene, with an individual painting being defined by a frame and a texture showing the painting. The user may physically walk through the museum, which movement may be tracked by the rendering device to adjust the overlay over the paintings to the user's position and viewing direction. As such, a user may move freely through the museum and view the paintings from different angles. The AR content, that is, the overlaid paintings, may be rendered entirely remotely by a remote rendering system, entirely locally by the rendering client or in a hybrid manner. For example, far away objects may be rendered by the remote rendering system while nearby objects may be rendered by the rendering device. The decision what is nearby and far away may be taken by the rendering device based on the position of the user relative to the objects.

In a specific example, the user may start at a position A1 and move to a position A2. At position A1, the user may be far away from object 1 so that object 1 does not need to be rendered locally as far away objects require less detail. As such, the remote rendering system may be requested to render object 1 remotely and stream a video showing a rendered version of object 1 from the perspective of the user to the rendering device. When moving closer to object 1, a higher resolution rendering of object 1 may be desired, so that the rendering device may switch to local rendering.

Signaling for Remote and Local Rendering

The hybrid rendering may involve signaling, e.g., for the client to request remote rendering and for the rendering server to respond to such requests, for example by acknowledging such requests and by deliver the prerendered scene data to the client. The signaling described in the following may use any suitable protocol and/or syntax. For example, the signaling may be based on WebSocket, or may be integrated into RTSP/RTCP control messages or make use of the HTTP REST API or other protocols. The following describes various signaling by focusing on the information contained within such messages, and not on the signaling protocols themselves.

A default case may be that the client may be in control of whether rendering is to be performed locally, remotely or in a hybrid manner. Exceptions to this default case are described elsewhere, such as the rendering server being unable to perform all requested remote rendering, e.g., due to insufficient computational resources.

Toggling Local and Remote Rendering

The following tables may show messages for enabling or disabling the remote rendering. A first message may be sent from the client to the rendering server to initialize the remote rendering. This message may contain various information as defined below. It will be appreciated that if here or elsewhere certain information is stated to be 'required', that this only pertains to this particular example of a message, in that in other types of messages, such information may not need to be required.

| InitRemoteRender (client to server) | | | |
|---|---|---|---|
| Field | Type | Required | Comments |
| MsgType | Text | Yes | Value = "InitRemoteRender" |
| Position | Vector | Yes | e.g., (x, y, z) |
| Orientation | Vector | No (if 360) | e.g. (yaw, pitch, roll) |
| PTS | Integer | Yes | Presentation Timestamp |

Here, the term 'position' may refer to a position in the scene, and more specifically, to a position of a viewport from which viewport the scene is rendered. This position may be defined as 3D coordinates, e.g., as x, y, z coordinates, but also in any other way, e.g., as 2D coordinates. Similarly, the term 'orientation' may refer to an orientation of a viewport from which viewport the scene is rendered, which orientation may be defined in any suitable manner, e.g., as respective yaw, pitch and roll angles.

Using this information, the rendering server may start creating the requested video stream for the requested position in the scene. The rendering server may confirm the request to the client with the following message:

| ConfirmRemoteRender (server to client) | | | |
|---|---|---|---|
| Field | Type | Required | Comments |
| MsgType | Text | Yes | Value = "ConfirmRemoteRender" |
| ReturnMsg | Text | Yes | Either 'Ack' or 'Nack' |
| SessionID | Integer | Yes | |
| Endpoint | Text | Yes | URL to the endpoint (e.g., MPD, RTSP, etc.) |
| Message | Text | No | Message. E.g., for indicating the reason why request could not be fulfilled. |

When the client wishes to stop the remote rendering of the object(s), the client may send the following message to the rendering server:

| StopRemoteRender | | | |
|---|---|---|---|
| Field | Type | Required | Comments |
| MsgType | Text | Yes | Value = "StopRemoteRender" |
| SessionID | Integer | Yes | |
| Command | Text | Yes | 'Stop' or 'Pause' |

After the remote rendering is set up, the client may periodically or semi-periodically or repeatedly send messages to the rendering server to update the position of the client in the scene, for example using the following message:

| UpdatePosition | | | |
|---|---|---|---|
| Field | Type | Required | Comments |
| MsgType | Text | Yes | Value = "UpdatePosition" |
| Position | Text | Yes | e.g., (x, y, z) |
| Orientation | Vector | No (if 360) | e.g. (yaw, pitch, roll) |
| PTS | Integer | Yes | Presentation Timestamp |

The rendering server may in return respond with a message indicating a new endpoint at which the client may retrieve the updated video stream:

| UpdateRemoteRender | | | |
|---|---|---|---|
| Field | Type | Required | Comments |
| MsgType | Text | Yes | Value = "UpdateRemoteRender" |
| ReturnMsg | Text | Yes | Either 'Ack' or 'Nack' |
| SessionID | Integer | Yes | |
| Endpoint | Text | Yes | URL to the endpoint (e.g., MPD, RTSP, etc.) |
| Message | Text | No | Message. E.g., for indicating the reason why request could not be fulfilled. |

Modeling Temporal Behavior

In addition to defining a scene in terms of a spatial arrangement of objects, the scene descriptor data may define changes in the scene over time. For example, the scene descriptor data may describe one or more of: a presence, a position, an orientation, and an appearance, of a respective object, at one or more time instances to define the changes in the scene over time. Thereby, the temporal state of the scene may be described over time. In a specific example, such changes may be described at or for a plurality of time instances on a scene timeline. Such modelling of temporal dynamism in a scene may be advantageous for dynamic scenes. For example, a scene may represent a dynamic 3D environment, such as a science museum where objects can move around, and users can interact with objects. To define which object is where in the scene, a clock and a reference time may be used. The reference time may for example be referred to as a presentation timestamp ('pts' or 'PTS'), analogous to presentation timestamps in the playout of media content, such as MPEG DASH video streams. The scene descriptor data may define changes in the scene by referring to such presentation timestamps. For example, the scene descriptor data may define, for each or a number of objects, a number of events for different time instances, while defining for each of these events a possibly different position of the object(s), as also elucidated in the table below. Here, 'event' tags may be used to define presentation timestamps for events and to define the events themselves.

Accordingly, in the example below, an object having object identifier "1" is defined to move over the x-axis between PTS=0 to 2 and then again at PTS=9.

```
<object id="1">
    <event pts="0" x="0" y="0" z="0"/>
    <event pts="1" x="1" y="0" z="0"/>
    <event pts="2" x="2" y="0" z="0"/>
    <event pts="9" x="3" y="0" z="0"/>
</object>
```

Such and similar types of scene descriptor data may enable the client to request the rendering server to render a part of the scene at a particular time instance. In some embodiments, the client may request the rendering server to specifically render the part at a future time instance, referring to a time instance which is ahead of a currently rendered time instance by the client. This way, latencies in the network between the client and the rendering server, and/or latencies in the rendering by the rendering system, and/or other latencies in the 'end-to-end' chain from remote rendering to display of the remotely rendered content, may be accommodated.

Figure 3:
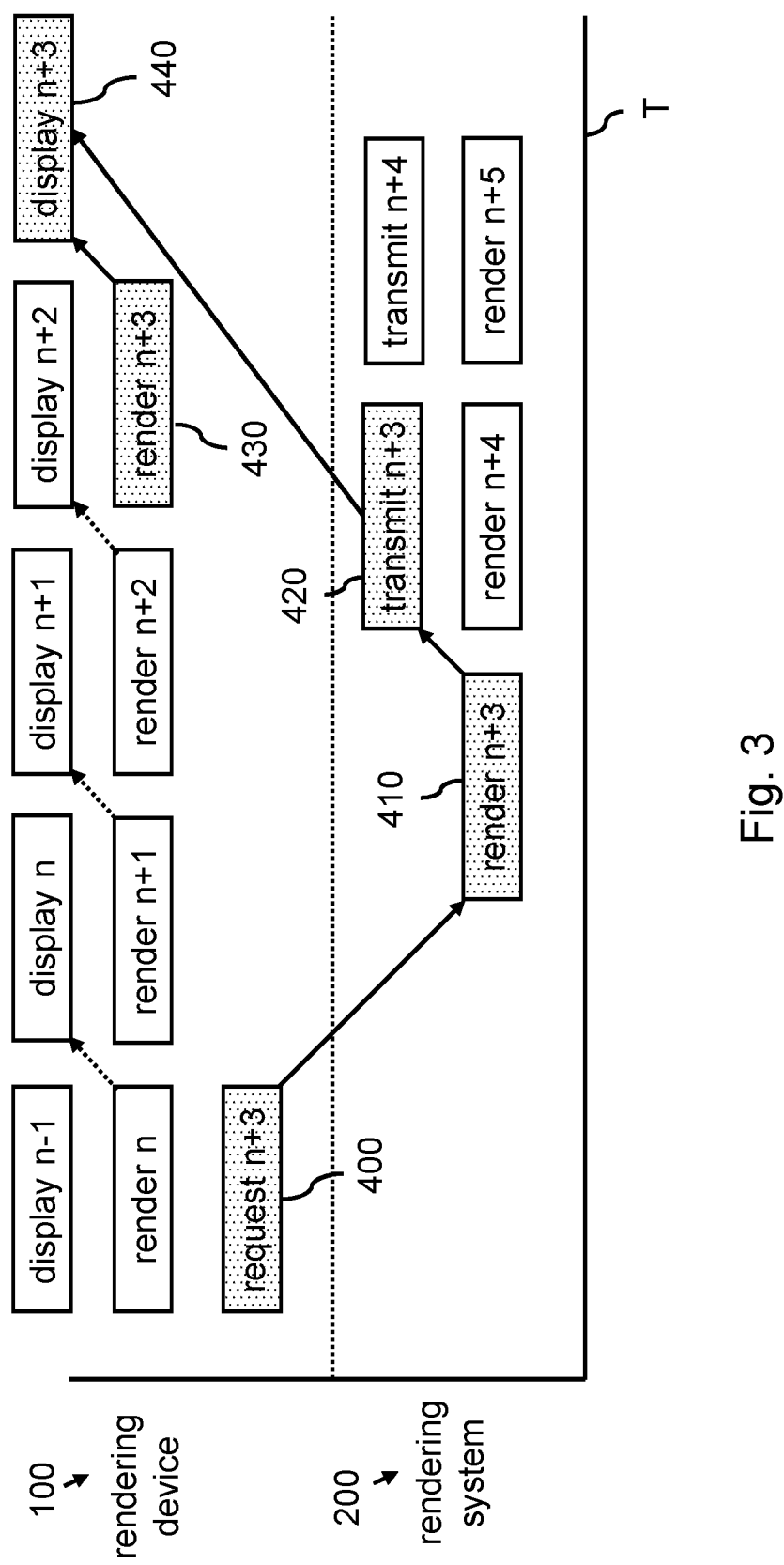
FIG. 3 illustrates a request for remote rendering of a scene part for a time instance which is ahead in time of current time instance at which the scene is rendered.

FIG. 3 illustrates such a request for remote rendering of a scene part for a time instance which is ahead in time of a current time instance at which the scene is rendered. Here, a subset of the steps performed by the rendering device 100 as client and the remote rendering system 200 as rendering server are shown. These steps include the rendering device 100 locally rendering content for consecutive output frames n, n+1, n+2, n+3, etc., with the rendered content then being displayed after rendering. It may be decided to have the rendering system 200 assist in the rendering of the scene. Accordingly, at a time when rendering frame n, the rendering device 100 may send a request 400 to the rendering system 200 to render one or more objects at a time instance corresponding to frame n+3. Upon receiving this request, the rendering system 200 may then render 410 this part of the scene at the particular time instance, thereby obtaining prerendered scene data for this time instance. The prerendered scene data may then be transmitted 420 and received on time by the rendering device 100 to be displayed 430 together with the content locally rendered 430 for frame n+3.

Synchronization

There may be several approaches for a client to accurately combine a remotely rendered object with a locally rendered object, both spatially as well as temporally. The following considers how to ensure temporal alignment, which may also be referred to as 'synchronization'. Here, it is assumed that both the remote rendering by the rendering server and the local rendering by the client results in respective video frames which are to be synchronized. It will be appreciated, however, that a rendered object may also be generated as another data structure than a frame.

Using clocks: the entity generating a frame, such as the client or the rendering server, may correlate a generated frame to an internal clock, e.g., by generating a presentation timestamp using the clock and tagging the generated frame with this presentation timestamp. However, both internal clocks may not need to be synchronized. Rather, it may suffice for each entity to know a start time of the clock at a start of rendering the scene, to define an increment for the presentation timestamp per frame, and to define a frame rate. This way, a presentation timestamp generated by the rendering server which is transmitted alongside a frame to the client may be translated by the client to a presentation timestamp generated by the client. An example may be the following: the client may start to render a scene with object A being rendered by the rendering server and object B being rendered locally. The scene descriptor may describe that at PTS=10 both object A and object B will rotate 90-degrees. For this to happen synchronously, the client may need to know how the received frames of object A correlate in time with the locally generated frames of object B before they can be combined, e.g., by overlaying or blending or in another way. For this purpose, both the framerate and the increment of the clock per frame may be defined in the descriptor file. As an example, for a framerate of 30 and an increment of 1 for every frame, when the client receives a frame for PTS=10, the client may know that the frame is for its own PTS equal to: current_time_wallclock−start_time_wallclock+(1/30*10).

Using timeouts: a maximum duration (or response time) may be defined for the rendering server to respond to a request of a client. This maximum duration or response time may be signaled to the rendering server. If the response from the rendering server containing the remotely rendered frame arrives after this maximum duration or response time, the response may be considered to be lost/invalid. In such an approach, a request may pertain to the rendering of a single frame.

Using frame numbers: each request may include a frame number, which may be the frame number that the remotely rendered frame is expected to have. Upon receipt of a prerendered frame, the client may compare the frame numbers to match remotely rendered frames to locally rendered frames. For such an approach, it is preferable for the framerate to be known at both the rendering server and the client.

Using an asynchronous API: in such an approach, a communication channel may be open between the rendering server and the client, and whenever a rendered output from the rendering server is ready, an event may be triggered via the API. In response, the client may parse the event properties via the API, which event properties may include an object identifier, a frame number and/or other information.

In some embodiments, the client may signal properties of objects that were changed to the rendering server, for example after a disconnect between the client and the rendering system and in cases where a user can interact with an object. Such signaling may be performed in similar ways as the signaling described earlier, but may for example comprise the following types of information:

| ObjectUpdate | | | |
|---|---|---|---|
| Field | Type | Required | Comments |
| SessionID | Integer | Yes | |
| PTS | Integer | Yes | |
| ObjectID | Integer | Yes | |
| X | Integer | No | Not needed if nothing is changed |
| Y | Integer | No | Not needed if nothing is changed |
| Z | Integer | No | Not needed if nothing is changed |

Switching Logic from Local Rendering to Remote Rendering and Back

During a hybrid rendering session, it may occur that the rendering of one or more objects switches from local rendering to remote rendering, and vice versa. This may occur several if not many times during a rendering session. To make such switching as seamless as possible, the client may need to determine when to stop locally rendering an object and to use an incoming video stream containing the rendered object instead. Namely, if such local rendering is stopped before the remotely rendered object is available, the user may experience an object disappearing and reappearing or may perceive the same object twice, e.g., placed over each other.

It may thus be desirable to know when to start or stop locally rendering an object at the client. This may be known by knowing the object identifier of the object for which rendering will switch from local to remote or vice versa, and to know the PTS or other temporal marker of when this switch is about to occur. Since the client may decide to switch, such information may be known to the client.

However, the rendering server may need to transmit, for a remotely rendered frame, the PTS or other temporal marker to which the remotely rendered frame relates. This may be signaled as a message via for example WebSocket, in the SEI Message of the frame, as a RTP Sender Report, etc., and may for example comprise the following information:

| FrameInformation | | | |
|---|---|---|---|
| Field | Type | Required | Comments |
| SessionID | Integer | Yes | |
| PTS | Integer | Yes | |
| ObjectID | Integer | No | Only needs to be indicated when stream is started or the object in the stream changes. |

When the client switches to local rendering, the video stream or the part of a video stream to which the object identifier pertains may be discarded by the client. When the client switches from local to remote rendering, the client may stop locally rendering the object when the received object identifier indicates that the video stream contains the remotely rendered version of the object for the desired PTS.

Adaptation Schemes

When deciding between having an object rendered locally by the client or remotely by the rendering server, various criteria may be used. These criteria may in some cases allow the client to adapt its hybrid rendering to certain events or situations. The following describes such criteria and the corresponding adaptation schemes.

Adaptation Based on Object Complexity

A client may have limited or even very limited processing capabilities. The latter may especially apply to some types of mobile clients. Therefore, a distinction may be made between more complex and regular or less complex objects so the client may decide which objects to render where. Such complexity may be defined or indicated in various ways, including but not limited by the number of polygons and/or by the number of nested object parts. The client's decision process to decide whether to render an object locally or have the object rendered remotely may for example involve:

1. The client may determine the maximum number of polygons it can render.
2. The scene descriptor may indicate the number of polygons per object.
3. The client may indicate the number of polygons it can render to the remote rendering server.
4. The client may fetch a remotely rendered video representation of high-polygon objects from the rendering server.

An example of a message to have complex objects rendered remotely may comprise the following information:

| InitComplexRemoteRender | | | |
|---|---|---|---|
| Field | Type | Required | Comments |
| MsgType | Text | Yes | Value = "InitComplexRemoteRender" |
| Position | Vector | Yes | e.g., (x, y, z) |
| Orientation | Vector | No (if 360) | e.g. (yaw, pitch, roll) |
| MaxComplexity | Integer | Yes | Indicates number of polygons to render |
| PTS | Integer | Yes | Presentation Timestamp |

Using the information provided by this message from the client, the rendering server may start creating the requested video stream containing the objects with a complexity higher than 'MaxComplexity'. The rendering server may respond to the request of the client with the following message:

| ConfirmComplexRemoteRender | | | |
|---|---|---|---|
| Field | Type | Required | Comments |
| MsgType | Text | Yes | Value = "ConfirmComplexRemoteRender" |
| ReturnMsg | Text | Yes | Either 'Ack' or 'Nack' |
| SessionID | Integer | Yes | |
| Endpoint | Text | Yes | URL to the endpoint (e.g., MPD, RTSP, etc.) |
| Message | Text | No | Message. E.g., for indicating the reason why request could not be fulfilled. |

When the client wishes to stop the remote rendering of the object(s), the client may send the following message:

| StopComplexRemoteRender | | | |
|---|---|---|---|
| Field | Type | Required | Comments |
| MsgType | Text | Yes | Value = "StopComplexRemoteRender" |
| SessionID | Integer | Yes | |
| Command | Text | Yes | 'Stop' or 'Pause' |

Adaptation Based Distance from Object

The decision for local rendering and remote rendering by the rendering server may additionally or alternatively be made depending on the position of the client within the scene. Such position-dependent adaptation may be advantageous as it may be resource intensive for the client to render the complete scene. By only rendering objects that are nearby, the client can save processing resources, such as computational resources or battery power, etc. With continued reference to the AR example in which a user may start at a position A1 and move to position A2, the adaptation based on distance from an object may comprise the following:

1. The client may fetch the scene descriptor.
2. The client may fetch the 3D assets.
3. The client may determine its current position (A1)
  a. Based on the position in the scene, the client may determine which objects lie within its field of view and within a particular radius
  b. At position A1, this may result in zero objects being identified, meaning that all other visible objects (e.g., outside of the particular radius) may be rendered remotely by the rendering server.
  c. The client may therefore fetch a video stream comprising a prerendered version of these objects from the rendering server.
4. The client may move to the A2 position.
  a. The client may determine that object 1 lies within its field of view and within the particular radius and may therefore locally render object 1 and combine the locally rendered object 1 with the prerendered version of the remaining visible objects from the rendering server.

The signaling of which objects to render remotely may be done by following the same steps as for the toggling of local and remote rendering, but this may require a long list of objects to remotely render. Alternatively, such signaling may involve the following message, in which the client signals which objects are to be rendered locally, and from which the rendering server can determine, based on the scene descriptor, which objects are to be rendered remotely. The latter may involve determining which objects are visible to the client and omitting the objects to be locally rendered.

| InitLocalRender | | | |
|---|---|---|---|
| Field | Type | Required | Comments |
| MsgType | Text | Yes | Value = "InitLocalRender" |
| Position | Vector | Yes | E.g., (x, y, z) |
| Orientation | Vector | No (if 360) | e.g. (yaw, pitch, roll) |
| ObjectID | [Integer] | Yes | Objects to render locally |
| PTS | Integer | Yes | Presentation Timestamp |

Using the information provided by this message, the rendering server may start creating the requested video stream containing the object(s) that are not indicated to be rendered locally. The rendering server may respond to the request of the client with the following message:

| ConfirmLocalRender | | | |
|---|---|---|---|
| Field | Type | Required | Comments |
| ReturnMsg | Text | Yes | Value = "ConfirmLocalRender" |
| SessionID | Integer | Yes | |
| Endpoint | [ID, Text] | Yes | URL to the 3D asset |
| Message | Text | No | Message. E.g., for indicating the reason why request could not be fulfilled. |

After the remote rendering is set up, the client may periodically or semi-periodically or repeatedly send messages to the rendering server to update the position of the client in the 3D environment, for example using the following message, which may additionally comprise a field to indicate object identifiers of objects that will be rendered locally. The message may be as follows:

| UpdatePosition | | | |
|---|---|---|---|
| Field | Type | Required | Comments |
| MsgType | Text | Yes | Value = "UpdatePosition" |
| Position | Vector | Yes | E.g., (x, y, z) |
| Orientation | Vector | No (if 360) | e.g. (yaw, pitch, roll) |
| ObjectID | [Integer] | Yes | Objects to render locally |
| PTS | Integer | Yes | Presentation Timestamp |

When the client wishes to stop the local rendering of the object(s), the client may send the following message to the rendering server. In response to this message, the rendering server may start to remotely render all relevant objects of the scene.

| StopLocalRender | | | |
|---|---|---|---|
| Field | Type | Required | Comments |
| MsgType | Text | Yes | Value = "StopLocalRender" |
| SessionID | Integer | Yes | |
| Command | Text | Yes | 'Stop' or 'Pause' |

Adaptation Based on Processing Capabilities

Rendering a scene may strain local processing resources, such as the client's CPU(s) and GPU(s), particularly for photorealistic scenes, so-called 6DOF (degrees-of-freedom) experiences, etc. With hybrid rendering, the client and rendering server may share rendering tasks. The client may request the rendering server to assist in the rendering of the scene, for example in the following manner:

1. The client may monitor its CPU and/or GPU load.
2. If the CPU and/or GPU reaches 100%, or any earlier threshold, the client may request (additional) remote rendering by the rendering server, for example by remotely rendering additional (and/or high polygon) objects.

The rendering server may also initiate a request for assistance by the client:

1. The server may monitor its CPU and/or GPU load and communicate the CPU and/or GPU load to the client, for example periodically.
2. The client may check if the rendering server can handle an additional load associated with remotely rendering (additional) objects.
3. If this additional load can be handled, the client may indicate to the rendering server which object(s) are to be rendered remotely.

Adaptation Based on Bandwidth

A client may estimate the bandwidth available for streaming, for example by counting the number of bytes entering a network buffer and determining an average per second. Based on this estimated available bandwidth, the client may determine to switch to local rendering, remote rendering or to change the ratio in hybrid rendering, e.g., more remote, or more local rendering. In particular, if there is little available bandwidth, the client may switch or change the ratio towards local rendering, whereas if there is ample available bandwidth, the client may switch or change the ratio towards remote rendering. This may for example involve the following steps:

1. If the bandwidth is too low or reduces to zero (e.g., when the client loses network connectivity connection), the client may switch to local rendering.
2. If the bandwidth recovers, the client may switch to remote rendering. In this case, a synchronization step may occur prior to switching, e.g., to verify that both the client and the rendering server have the same version of the scene description.

It will be appreciated that the client and/or rendering server may also monitor the bandwidth in any other manner, and may switch between local and remote rendering, or change the ratio in hybrid rendering, depending on such bandwidth measurements. In general, if a client is necessitated to render more objects locally, the client may reduce the quality of its local rendering so as to be able to render these objects locally. Conversely, if the client is able to make use of remote rendering for at least some objects, the client may increase the quality of the local rendering again.

Adaptation Based on Latency

In scenarios where it is possible for the client to render at least some objects locally, latency may be taken into consideration to determine when or if to switch to local rendering, remote rendering or to change the ratio in hybrid rendering. Such latency may for example be defined as the network latency between client and rendering server, or the end-to-end latency, e.g., the combined time of frame creation at the rendering server, encoding, packaging, transmitting, and decoding at the client, or in any other way. In general, when making use of remote rendering, it may be needed for a frame to arrive 'in time', meaning at a time before the frame is to be displayed. Whether this is possible may depend on the latency of remote rendering. However, even if the latency is sufficient for frames to be received and display on time, the client may still determine to switch fully or partially to local rendering to mitigate the chances of late or no reception when network conditions deteriorate. For example, the client may decide to have more static objects rendered remotely, while rendering more dynamic objects locally, to reduce visual artifacts if network conditions deteriorate.

The latency may be calculated by the client. For example, when the client's clock is in sync with that of the server, the client may subtract a frame creation time, which may for example be indicated as a timestamp in metadata accompanying the frame, from the time the frame is received by the client. The frame creation time may for example be signaled by the server via WebSocket, RTCP/RTSP commands or may be fetched by the client via HTTP REST API. The message may for example comprise:

| FrameCreation Message | | | |
|---|---|---|---|
| Field | Type | Required | Comments |
| FrameNr | Integer | Yes | |
| PTS | Integer | Yes | |
| Wallclock | Integer | Yes | E.g., Unix or EPOCH. Contains the wallclock time on the server when the frame was created. |

The toggling commands may be similar as described for the toggling of local and remote rendering and for the adaptation based on distance from an object.

Adaptation Based on Battery Level

Rendering a scene may require significant computational resources, which in turn may consume power. This may be disadvantageous for mobile clients. To save battery, the client may, dependent on its battery level, determine to switch to remote rendering partially or fully. This may result in a reduction of power consumption as rendering 3D graphics objects may be more power consuming than receiving and decoding a video stream. Such switching may be effected when the battery level drops below a threshold. In some embodiments, the client may gradually request more objects to be rendered remotely as the battery level reduces. Additionally, or alternatively to the battery level, the client may take the power consumption rate into account, in that a higher power consumption rate may prompt the client to request remote rendering earlier than for a lower power consumption rate. Additionally to the battery level, the client may take the complexity of the rendered objects into account since the rendering of highly complex objects may consume more power. For example, highly complex objects may be preferably remotely rendered, or if the scene contains on average more complex objects, the client may switch to remote rendering earlier.

Combining Remotely Rendered Objects with Local Environment

Combining remotely rendered objects with locally rendered objects may be done in various ways, of which examples are described in the following.

Any messages may be transmitted in various ways, for example using WebSocket, in the SEI Message of the frame, RTP Sender Report, etc., or any of the previously mentioned transmission methods for messages.

Placing Video Frames in 3D Environment

The client may indicate its position and orientation to the rendering server and receive a video-based representation of the objects that are in its field of view. Conceptually, the generation of the video-based representation by the rendering server may resemble a recording by a virtual camera in the scene. The resulting video frames may be placed by the client in the 3D environment representing the scene at the indicated position. Such placement may represent a virtual screen in the 3D environment on which the output of the virtual camera may be projected. To enable such placement, the following information may be sent by the rendering server to the client, for example for each frame or for each keyframe of the video stream:

| FrameInformation | | | |
|---|---|---|---|
| Field | Type | Required | Comments |
| SessionID | Integer | Yes | |
| PTS | Integer | Yes | |
| Position | Vector | Yes | Contains x, y, z of where the plane will be located in the 3D environment. |
| Transformations | Array | No | |
| Dimensions | Vector | No | |
| Rotation | Integer | Yes | |
| ObjectID | [Integer] | No | Only when one or more objects are contained in the video stream |

Blending of Both Locally and Remotely Generated Frame

Another way to combine remotely rendered objects with locally rendered objects may be to render each as respective frames and to overlay the frames before rendering on the display. For example, two frames may simply be placed on top of each other, with at least one of the frames being partly transparent outside of the rendered content, or if a used video codec does not support transparency, containing an opaque color that may be signaled to and made transparent by the client. To enable such blending of frames, the following information may be sent by the rendering server to the client, for example for each frame or for each keyframe of the video stream:

| FrameInformation | | | |
|---|---|---|---|
| Field | Type | Required | Comments |
| SessionID | Integer | Yes | |
| PTS | Integer | Yes | |
| ObjectID | Integer | No | Only needs to be indicated when stream is started or the object in the stream change. |
| RemoveColor | Text | No | Contains hexadecimal value indicating what parts of the frame can be made transparent. |
| Position | Vector | No | Indicates where the frame should be placed in the 2D rendering context |

Receiving Stream of Video with 2D Depiction of 3D Object

Another example is that when objects are rendered remotely, they may be transmitted as unfolded polygons in a 2D frame. The client may reconstruct such an object by folding the polygons and placing the folded object within the 3D environment with a specified texture. To enable such client-sided folding of unfolded polygons in a 2D frame, the following information may be sent by the rendering server to the client, for example for each frame or for each keyframe of the video stream:

| FrameInformation | | | |
|---|---|---|---|
| Field | Type | Required | Comments |
| SessionID | Integer | Yes | |
| PTS | Integer | Yes | |
| ObjectID | Integer | No | Only needs to be indicated when stream is started or the object in the stream change. |
| Position | Vector | Yes | X, Y, Z |
| Rotation | Integer | Yes | |

As mentioned earlier, the response might be a texture (or material, or other graphics engine 2D content). In such case an anchor point (usually expressed as a 2-dimensional position) may be indicated to indicate which point of the texture (e.g., top-left or center) is the point-of-reference—instead of a position and rotation.

Multiplexing Videos Containing Objects

In some embodiments, each video stream received by the client may contain remotely rendered versions of one or more objects. The rendering server may generate a separate video stream for each of these objects, or for each group of connected objects. Accordingly, depending on the number of objects to be remotely rendered, the client may receive a multitude of video streams which may all need to be decoded, e.g., using a separate decoder or decoder instance. To limit the number of video streams that are transmitted to, and thus have to be decoded by the client, two or more video streams may be multiplexed by the rendering server into one video stream. In this case, the signaling to the client may contain the following information:

| FrameInformation | | | |
|---|---|---|---|
| Field | Type | Required | Comments |
| SessionID | Integer | Yes | |
| PTS | Integer | Yes | |
| ObjectID | [Integer] | Yes | A list of the Object IDs contained in the frame. |
| Dimensions | [Vector] | No | The dimensions of each rendered object contained in the frame (only when multiple objects are present) |

For this simple example, it is assumed that all the packed objects of the frame are rectangular, with known packing order. Other more complex implementations might require extra information, e.g., anchor points, transparency maps etc.

Scene Graph Definition

A scene may be at least in part modelled by a scene graph. For example, a scene graph may be a directed acyclic graph, for example a plain tree-structure which represents an object-based hierarchy of the geometry of a scene. The scene descriptor data may comprise such a scene graph or refer to a scene graph stored elsewhere. A scene graph may be defined in various ways, as will be elucidated in the following.

For example, depending on the distance from the viewpoint rendered by the client to one or more objects in the scene, it may be desirable to either locally render objects, e.g., for nearby objects, or receive a video stream containing prerendered versions of objects, e.g., for far away objects. Some of the objects in a scene may fully or partially occluded (e.g., an object behind a window in an aquarium) or may be located in a space which is inaccessible to the user (e.g., in a theater). These objects may form a group (e.g., a swarm of fish, or a group of actors). In some cases, the group itself may be considered an object. There may also be objects which may comprise separate yet connected object parts. In cases where an object comprises other objects or separate yet connected object parts, it may not always be needed to render such other objects or object parts individually at the client. Rather, it may be advantageous in certain situations to have these remotely rendered as a group of objects or object parts and delivered to the client in form of a video stream.

Both the situation in which a group of objects may be considered an object itself, and an object comprising separate yet connected object parts, may in the following be referred to as 'nested objects' as there may be a hierarchy between the objects or object parts. This hierarchy may be reflected in the scene descriptor data, in that the scene descriptor data may comprise or refer to a scene graph which may indicate relationships between the objects of the scene. Based on this scene graph, the client may decide to render objects locally and individually or to retrieve a video stream comprising a prerendered version of the objects. An example of such a graph may be the following, where objects are defined to belong to a branch. The branch may for example represent a group of the objects, or a larger object comprising the individual objects. Such a graph may be created in different formats such XML, JSON, plain text with indents, etc. The following shows an example in XML format.

```
<scene id="1">
    <branch id="1.2">
        <object id="1.2.1"/>
        <object id="1.2.2"/>
        <object id="1.2.3"/>
        <object id="1.2.4"/>
    </branch>
</scene>
```

In more complex situations, branches may also contain sub-branches. An example of this is shown below:

```
<scene id="1">
    <branch id="1.2">
        <branch id="1.2.1">
            <object id="1.2.1.1"/>
            <object id="1.2.1.2"/>
            <object id="1.2.1.3"/>
            <object id="1.2.1.4"/>
        </branch>
        <object id="1.2.2"/>
        <object id="1.2.3"/>
        <object id="1.2.4"/>
    </branch>
</scene>
```

Messaging

When requesting the rendering server to render the objects or object parts belonging to one or more branches in the scene graph, the following messaging may be used, which may be followed by a message representing the server's response:

| RemoteRenderBranch (client to server) | | | |
|---|---|---|---|
| Field | Type | Required | Comments |
| MsgType | Text | Yes | Value = "RemoteRenderBranch" |
| Position | Text | Yes | E.g., (x, y, z) |

-continued

| RemoteRenderBranch (client to server) | | | |
|---|---|---|---|
| Field | Type | Required | Comments |
| PTS | Integer | Yes | Presentation Timestamp |
| Branch | [Integer] | Yes | Array of branches to render |

| RemoteRenderBranch (server to client) | | | |
|---|---|---|---|
| Field | Type | Required | Comments |
| ReturnMsg | Text | Yes | Either 'Ack' or 'Nack' |
| SessionID | Integer | Yes | |
| Endpoint | [Text] | Yes | Array of URL's to the endpoint (e.g., MPD, RTSP, etc.) |
| ObjectEndpoint | Text | Yes | URL to the endpoint of the container object |
| Message | Text | No | Message. E.g., for indicating the reason why request could not be fulfilled. |

In general, there may be various variations of the embodiments described in this specification. For example, the scene descriptor data may, in addition to defining dynamic aspects of the scene, also comprise or refer to content which is used in the dynamism. For example, the scene descriptor data may comprise or refer to animation data defining animations of objects, or interaction data defining changes of objects under certain conditions, or semantic properties of the objects (e.g., "alive" or "artifact"), or post-processing metadata defining rendering hints (e.g., to merge light or audio sources), content properties (e.g., "generated" or "captured") and other information that may useful to the client (e.g., object lifespan).

In general, the content and syntax of messages described in this specification may represent metadata as defined elsewhere in this specification.

In general, a scene may combine 3D graphics objects with video. For example, a 3D graphical object may represent a virtual display on which a video may be displayed. A specific yet non-limiting example is a film with video avatars in which a camera recording of an actor's face is displayed as a texture on the face of a 3D model of the actor. In addition, when using hybrid rendering, some 3D graphics objects may be prerendered by the rendering server and delivered to the client in form of a video stream. From the perspective of the client, the scene may thus appear to be comprised of one or more video streams, e.g., of the remotely prerendered 3D graphics objects, and the 3D assets of 3D graphics objects to be rendered locally. In video streaming, for example when using MPEG DASH, a client may request a media presentation descriptor file (MPD) and select one or more media segments to download. In server-hosted 3D environments, a client may download a description of the 3D environment and all the assets and uses this description and downloaded assets this to render the 3D environment. Both techniques may be combined to enable the rendering of scenes which combine 3D graphics objects with video. Accordingly, a scene may be defined by two different types of descriptors: one or many MPD's and one or many 3D scene descriptors. By combining these two types of descriptors, the client may know where to retrieve the data needed, e.g., one or more video streams and the 3D assets of the scene.

In some embodiments, instead of or additionally to the client determining which objects to render where, e.g., locally or remotely, such a decision between local and remote rendering may also be taken partially or fully by the rendering server. In such embodiments, the client may send regular updates to the server characterizing its local rendering conditions, which may include information on battery level, connection strength, GPU usage etc. The rendering server may then, based on such information, determine which objects to render where. In such examples, the client may also be configured to switch to local rendering if the connection to the rendering server is poor or lost.

In some embodiments, at any given moment during the rendering session, the server may request the client to adjust the division between remote and local rendering, for example to have fewer objects rendered remotely by the server in case of insufficient resources at the server. Such requests may be ignored by the client.

In some embodiments, a scene validation may be triggered by the client or by the rendering server, for example after a loss of connectivity between the client and the rendering server. Such scene validation may comprise comparing the scene descriptor data between the client and the rendering server to check for consistency, for example by exchanging hashes and/or versioning numbers of the scene descriptor data. If such validation fails, an update may be sent or the scene descriptor data may be retrieved anew, for example from a content server or from the respective entity which is deemed to have a valid or up-to-date version of the scene descriptor data.

With continued reference to the rendering device 100 of FIG. 1, it is noted that the network interface 120 of the rendering device 100 may for example be a wireless communication interface, which may also be referred to as a radio interface, and which may be configured to connect to a mobile network infrastructure. In some examples, the network interface 120 may comprise a radio and an antenna, or a radio and an antenna connection. In a specific example, the network interface 120 may be a 4G or 5G radio interface for connecting to a 4G or 5G mobile network adhering to one or more 3GPP standards, or a Wi-Fi communication interface for connecting to a Wi-Fi network infrastructure, etc. In other examples, the network interface 120 may be a wired communication interface, such as an Ethernet or fiber-optic based interface.

It is noted that the data communication between the rendering device 100 and the remote rendering system 200 may involve multiple networks. For example, the rendering device 100 may be connected via a radio access network to a mobile network's infrastructure and via the mobile infrastructure to the Internet, with the remote rendering system 200 being a server which is also connected to the Internet.

The rendering device 100 may further comprise a processor subsystem 140 which may be configured, e.g., by hardware design or software, to perform the operations described in this specification in as far as pertaining to the rendering device or the rendering of a scene as an augmentation of a video object or external environment. In general, the processor subsystem 140 may be embodied by a single Central Processing Unit (CPU), such as a x86 or ARM-based CPU, but also by a combination or system of such CPUs and/or other types of processing units, such as Graphics Processing Units (GPUs). The rendering device 100 may further comprise a display interface 180 for outputting display data 182 to a display 190. The display 190 may be an external display or an internal display of the rendering device 100, and in general may be head-mounted or nonhead mounted. Using the display interface 180, the rendering device 100 may display the rendered scene as an augmentation of a video object or external environment. In some embodiments, the display 190 may comprise one or more sensors, such as accelerometers and/or gyroscopes, for example to detect a pose of the user. In such embodiments, the display 190 may provide sensor data 184 to the rendering device 100, for example via the aforementioned display interface 180 or via a separate interface. In other embodiments, such sensor data 184 may be received in separation of the display.

As also shown in FIG. 1, the rendering device 100 may comprise a data storage 160 for storing data, including but not limited to the scene descriptor data 20. The data storage 160 may take various forms, such as a hard drive or an array of hard drives, a solid-state drive or an array of solid-state drives, a memory, etc.

In general, the rendering device 100 may be embodied by a (single) device or apparatus, e.g., a smartphone, personal computer, laptop, tablet device, gaming console, set-top box, television, monitor, projector, smart watch, smart glasses, media player, media recorder, etc. In some examples, the rendering device 100 may be a so-called User Equipment (UE) of a mobile telecommunication network, such as a 5G or next-gen mobile network. In other examples, the rendering device may be an edge node of a network, such as an edge node of the aforementioned mobile telecommunication. In such examples, the rendering device may lack a display output, or at least may not use the display output to display the rendered scene. Rather, the rendering device may render the scene, which may then be made available for streaming to a further downstream rendering device, such as an end-user device.

With continued reference to the remote rendering system 200 of FIG. 1, it is noted that the network interface 220 of the remote rendering system 200 may for example be a wired communication interface, such as an Ethernet or fiber-optic based interface. The network 10 may for example be the Internet or a mobile network, with the remote rendering system 200 being connected to a fixed part of the mobile network. Alternatively, the network interface 220 may be a wireless communication interface, e.g., being of a type as described above for the rendering device 100.

The remote rendering system 200 may further comprise a processor subsystem 240 which may be configured, e.g., by hardware design or software, to perform the operations described in this specification in as far as pertaining to a remote rendering system or in general to the rendering of a part of a scene for a rendering device. In general, the processor subsystem 240 may be embodied by a single CPU, such as a x86 or ARM-based CPU, but also by a combination or system of such CPUs and/or other types of processing units, such as GPUs. In embodiments where the remote rendering system 200 is distributed over different entities, e.g., over different servers, the processor subsystem 240 may also be distributed, e.g., over the CPUs and/or GPUs of such different servers. As also shown in FIG. 1, the remote rendering system 200 may comprise a data storage 260, such as a hard drive or an array of hard drives, a solid-state drive or an array of solid-state drives, a memory, etc., which may be used to store data, including but not limited to the scene description data 20.

The remote rendering system 200 may be distributed over various entities, such as local or remote servers. In some embodiments, the remote rendering system 200 may be implemented by a type of server or a system of such servers. For example, the remote rendering system 200 may be implemented by one or more cloud servers or by one or more edge nodes of a mobile network. In some embodiments, the remote rendering system 200 and the rendering device 100 may mutually cooperate in accordance with a client-server model, in which the rendering device 100 acts as client.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

Figures 4, 5, 6:
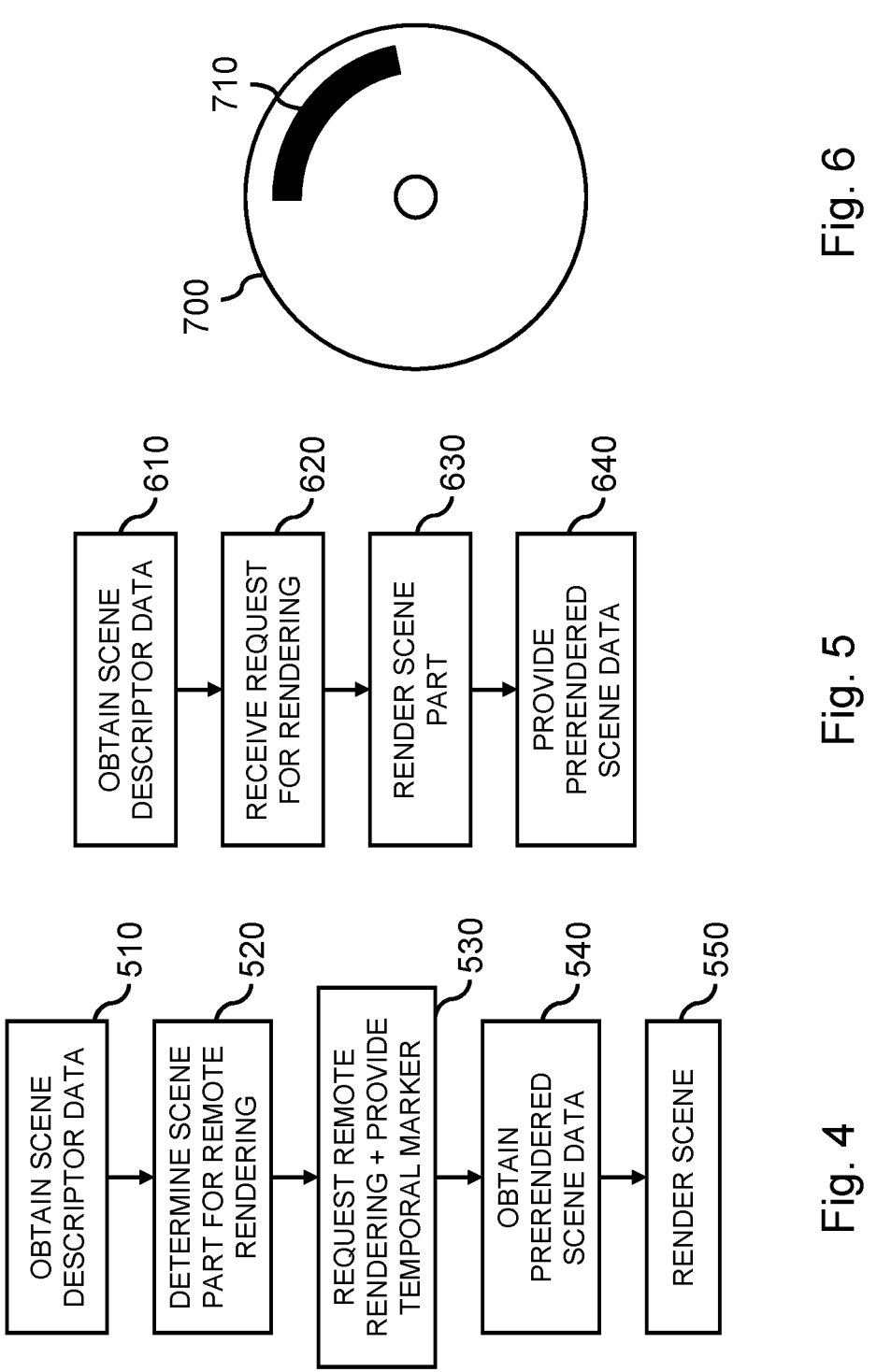
FIG. 4 show steps of a computer-implemented method for hybrid rendering of a scene, showing steps performed at or by a local rendering device.
FIG. 5 shows steps of a computer-implemented method for hybrid rendering of a scene, showing steps performed at or by a remote rendering system.
FIG. 6 shows a non-transitory computer-readable medium comprising data.

FIG. 4 show steps of a computer-implemented method for hybrid rendering of a scene, showing steps performed at or by a local rendering device. The method of FIG. 4 may comprise obtaining 510 scene descriptor data as described elsewhere in this specification, based on at least the scene descriptor data, determining 520 a first part of the scene to be rendered locally by the rendering device and a second part of the scene to be rendered remotely, and requesting 530 a remote rendering system having access to the scene descriptor data to render the second part of the scene to obtain prerendered scene data comprising a prerendered version of the second part of the scene, wherein the requesting comprises providing a temporal marker to the remote rendering system to request the remote rendering system to render the second part of the scene at the state corresponding to the temporal marker. The method may further comprise obtaining 540 the prerendered scene data from the remote rendering system, and rendering 550 the scene as the augmentation of the video object or the external environment, the rendering comprising locally rendering the first part of the scene and including the prerendered version of the second part of the scene.

FIG. 5 shows steps of a computer-implemented method for hybrid rendering of a scene, showing steps performed at or by a remote rendering system. The method of FIG. 5 may comprise obtaining 610 scene descriptor data as described elsewhere in this specification, receiving 620 a request to render part of the scene, wherein the request comprises a temporal marker, based on the scene descriptor data and the request, rendering 630 the part of the scene at the state corresponding to the temporal marker to obtain prerendered scene data comprising a prerendered version of the part of the scene, and providing 640 the prerendered scene data to the rendering device.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 700 as for example shown in FIG. 6, e.g., in the form of a series 710 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 6 shows by way of example an optical storage device 700.

In an alternative embodiment, the computer-readable medium 700 may be a transitory or non-transitory computer-readable medium and may comprise data 710 in the form of a data structure representing any of the scene descriptor data described in this specification.

Figure 7:
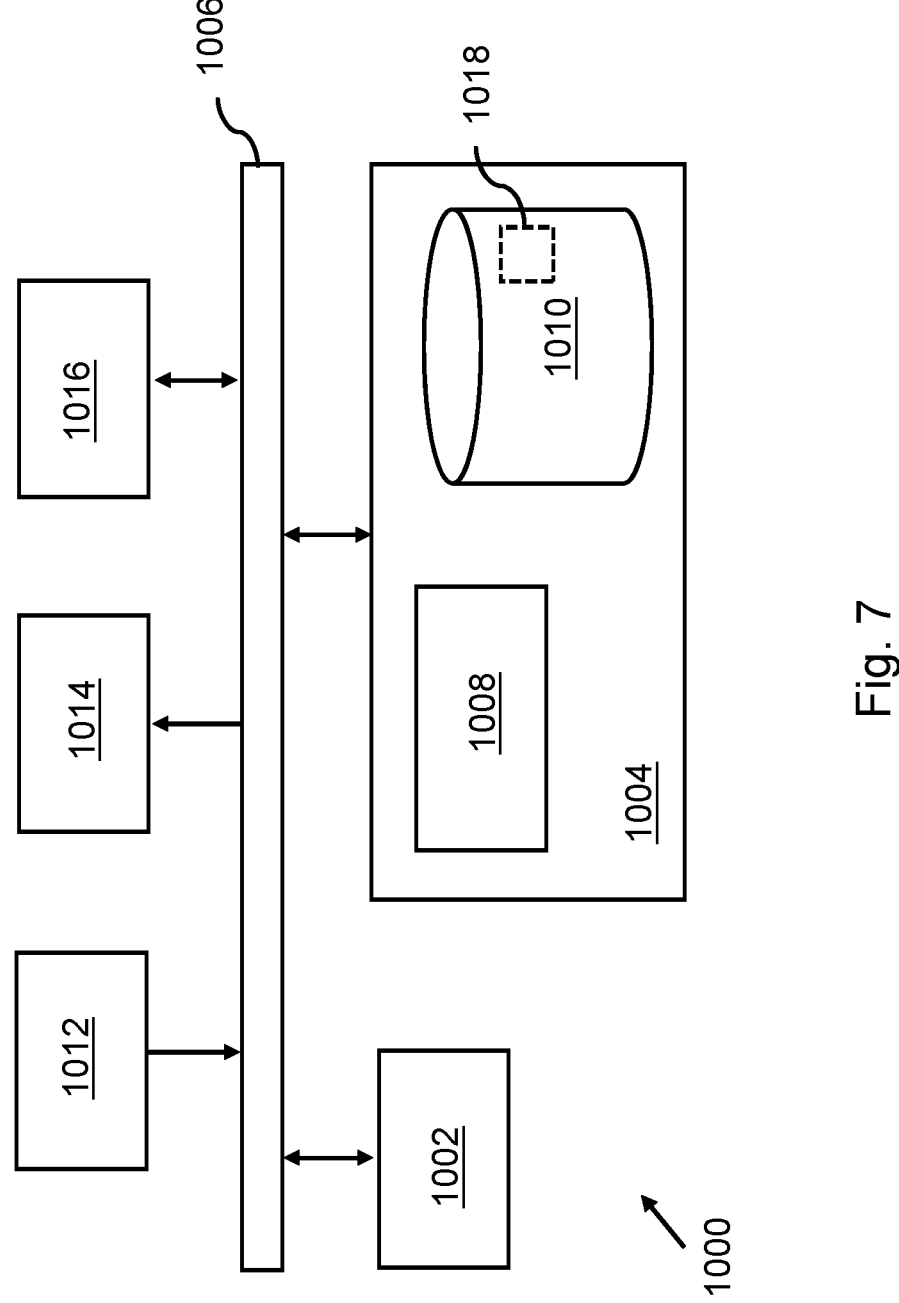
FIG. 7 shows an exemplary data processing system.

FIG. 7 is a block diagram illustrating an exemplary data processing system 1000 that may be used in the embodiments described in this specification. Such data processing systems include data processing entities described in this specification, including but not limited to the rendering device and the remote rendering system.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 7, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a rendering device as described with reference to FIG. 1 and elsewhere in this specification. In that case, application 1018 may represent an application that, when executed, configures data processing system 1000 to perform the functions described with reference to the rendering device. In another example, data processing system 1000 may represent a remote rendering system client as described with reference to FIG. 1 and elsewhere in this specification. In that case, application 1018 may represent an application that, when executed, configures data processing system 1000 to perform the functions described with reference to the remote rendering system.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of rendering a scene using a rendering device, wherein the rendering device is configured to display a video object or allow visual passthrough of an external environment to a viewer and to render the scene as augmentation of the video object or the external environment, the method comprising by the rendering device:

obtaining scene descriptor data, wherein the scene descriptor data identifies a set of 3D graphics objects representing at least part of the scene, wherein the scene descriptor data is indicative of changes in a state of the scene over time;

based on at least the scene descriptor data, determining a first part of the scene to be rendered locally by the rendering device and a second part of the scene to be rendered remotely;

determining a temporal marker to indicate a second time instance which is ahead in time of a first time instance at which the rendering device currently renders the scene;

requesting a remote rendering system having access to the scene descriptor data to render the second part of the scene to obtain pre rendered scene data comprising a prerendered version of the second part of the scene, wherein the requesting comprises providing the temporal marker to the remote rendering system to request the remote rendering system to render the second part of the scene at the state corresponding to the temporal marker;

obtaining the prerendered scene data from the remote rendering system;

rendering the scene as the augmentation of the video object or the external environment, the rendering comprising locally rendering the first part of the scene and including the prerendered version of the second part of the scene.

2. The computer-implemented method according to claim 1, wherein the scene descriptor data describes the state of the scene at a plurality of time instances on a scene timeline to indicate the changes in the state of the scene over time, and wherein the temporal marker is indicative of a time instance on the scene timeline.

3. The computer-implemented method according to claim 1, wherein the scene descriptor data is indicative of at least one of: a presence, a position, an orientation, and an appearance, of a respective object, in the scene over time.

4. The computer-implemented method according to claim 1, further comprising determining the temporal marker based on at least one of:

a network latency of a network between the rendering device and the remote rendering system;

a latency of, or scheduling constraints associated with, the rendering of the second part of the scene by the remote rendering system.

5. The computer-implemented method according to claim 1, wherein the scene descriptor data comprises object identifiers of respective ones of the set of 3D graphics objects, wherein:

the requesting the remote rendering system comprises providing respective object identifiers of one or more 3D graphics objects representing the second part of the scene to the remote rendering system; and/or the receiving of the prerendered scene data comprises receiving metadata comprising respective object identifiers of one or more 3D graphics objects which are prerendered in the prerendered scene data.

6. The computer-implemented method according to claim 5, wherein the metadata is received repeatedly, and wherein the method further comprises stopping or starting a local rendering of a 3D graphical object based on an object identifier of the 3D graphical object appearing in or disappearing from the metadata.

7. The computer-implemented method according to claim 1, wherein the rendering of the scene is adaptable to a content of the video object or of the external environment, and wherein the method further comprises determining content data which at least in part characterizes the content and providing the content data to the remote rendering system.

8. The computer-implemented method according to claim 7, wherein the content data comprises at least one of:

lighting data characterizing a lighting in the content;

depth data characterizing a depth of the content; and image or video data providing a visual representation of the content.

9. The computer-implemented method according to claim 1, wherein the determining of the first part of the scene to be rendered locally and the second part of the scene to be rendered remotely comprises determining whether a 3D graphical object is to be rendered locally or remotely based on at least one of:

a latency, bandwidth or reliability, of a network between the rendering device and the remote rendering system;

a latency, bandwidth or reliability, of a network between the rendering device and a content server, which content server is configured to host 3D graphics data defining the set of 3D graphics objects of the scene;

a computational load of the rendering device;

a computational load of the remote rendering system;

a battery level of the rendering device;

a complexity of the 3D graphical object; and a scene distance between a viewpoint in the scene from which the scene is rendered by the rendering device and the 3D graphical object in the scene.

10. The computer-implemented method according to claim 1, wherein the scene descriptor data comprises a graph comprising branches indicating a hierarchical relation between 3D graphics objects, wherein the determining of the first part of the scene to be rendered locally and the second part of the scene to be rendered remotely comprises determining per branch whether to render the 3D graphics objects of a respective branch locally or remotely.

11. A computer-implemented method of rendering part of a scene for a rendering device, wherein the rendering device is configured to display a video object or allow visual pass-through of an external environment to a viewer and to render the scene as augmentation of the video object or the external environment, the method comprising by a remote rendering system:

obtaining scene descriptor data, wherein the scene descriptor data identifies a set of 3D graphics objects representing at least part of the scene, wherein the scene descriptor data is indicative of changes in a state of the scene over time;

receiving a request to render part of the scene, wherein the request comprises a temporal marker which indicates a second time instance which is ahead in time of a first time instance at which the rendering device renders the scene at the time the rendering device determines the temporal marker;

based on the scene descriptor data and the request, rendering the part of the scene at the state corresponding to the temporal marker to obtain prerendered scene data comprising a prerendered version of the part of the scene;

providing the prerendered scene data to the rendering device.

12. The computer-implemented method according to claim 11, further comprising generating metadata comprising respective object identifiers of one or more 3D graphics objects which are prerendered in the prerendered scene data and providing the metadata with the prerendered scene data to the rendering device.

13. The computer-implemented method according to claim 11, further comprising adjusting the part of the scene which is requested to be rendered by omitting 3D graphics objects from the rendering based on one of:

a computational load of the remote rendering system;

a latency, bandwidth or reliability, of a network between the rendering device and the remote rendering system.

14. A non-transitory computer-readable medium comprising data representing a computer program, the computer program comprising instructions for causing a processor system to perform the method according to claim 11.

15. A non-transitory computer-readable medium comprising data representing a computer program, the computer program comprising instructions for causing a processor system to perform the method according to claim 1.

16. A rendering device configured to display a video object or allow visual pass-through of an external environment to a viewer and to render a scene comprising 3D graphics objects as augmentation of the video object or the external environment, the rendering device comprising:

a network interface to a network;

a data storage comprising scene descriptor data, wherein the scene descriptor data identifies a set of 3D graphics objects representing at least part of the scene, wherein the scene descriptor data is indicative of changes in a state of the scene over time;

a processor subsystem configured to:

based on at least the scene descriptor data, determine a first part of the scene to be rendered locally by the rendering device and a second part of the scene to be rendered remotely;

determine a temporal marker to indicate a second time instance which is ahead in time of a first time instance at which the rendering device currently renders the scene;

via the network interface, request a remote rendering system having access to the scene descriptor data to render the second part of the scene to obtain prerendered scene data comprising a pre-rendered version of the second part of the scene, wherein said requesting comprises to provide the temporal marker to the remote rendering system to request the remote rendering system to render the second part of the scene at the state corresponding to the temporal marker;

via the network interface, receive the prerendered scene data from the remote rendering system;

render the scene as the augmentation of the video object or the external environment, the rendering comprising to locally render the first part of the scene and to include the prerendered version of the second part of the scene.

17. The rendering device according to claim 16, wherein the scene descriptor data describes the state of the scene at a plurality of time instances on a scene timeline to indicate the changes in the state of the scene over time, and wherein the temporal marker is indicative of a time instance on the scene timeline.

18. The rendering device according to claim 16, wherein the scene descriptor data is indicative of at least one of: a presence, a position, an orientation, and an appearance, of a respective object, in the scene over time.

19. The rendering device according to claim 16, wherein the processor subsystem is configured to determine the temporal marker further based on at least one of:

a network latency of a network between the rendering device and the remote rendering system;

a latency of, or scheduling constraints associated with, the rendering of the second part of the scene by the remote rendering system.

20. The rendering device according to claim 16, wherein the scene descriptor data comprises object identifiers of respective ones of the set of 3D graphics objects, wherein:

to request the remote rendering system comprises to provide respective object identifiers of one or more 3D graphics objects representing the second part of the scene to the remote rendering system; and/or to receive the prerendered scene data comprises to receive metadata comprising respective object identifiers of one or more 3D graphics objects which are prerendered in the prerendered scene data.

21. The rendering device according to claim 20, wherein the metadata is received repeatedly, and wherein the processor subsystem is further configured to stop or start a local rendering of a 3D graphical object based on an object identifier of the 3D graphical object appearing in or disappearing from the metadata.

22. The rendering device according to claim 16, wherein the rendering of the scene is adaptable to a content of the video object or of the external environment, and wherein the processor subsystem is further configured to determine content data which at least in part characterizes the content and to provide the content data to the remote rendering system.

23. The rendering device according to claim 22, wherein the content data comprises at least one of:

lighting data characterizing a lighting in the content;
depth data characterizing a depth of the content; and
image or video data providing a visual representation of the content.

24. The rendering device according to claim 16, wherein to determine the first part of the scene to be rendered locally and the second part of the scene to be rendered remotely comprises to determine whether a 3D graphical object is to be rendered locally or remotely based on at least one of:

a latency, bandwidth or reliability, of a network between the rendering device and the remote rendering system;
a latency, bandwidth or reliability, of a network between the rendering device and a content server, which content server is configured to host 3D graphics data defining the set of 3D graphics objects of the scene;
a computational load of the rendering device;
a computational load of the remote rendering system;
a battery level of the rendering device;
a complexity of the 3D graphical object; and
a scene distance between a viewpoint in the scene from which the scene is rendered by the rendering device and the 3D graphical object in the scene.

25. The rendering device according to claim 16, wherein the scene descriptor data comprises a graph comprising branches indicating a hierarchical relation between 3D graphics objects, wherein to determine the first part of the scene to be rendered locally and the second part of the scene to be rendered remotely comprises to determine per branch whether to render the 3D graphics objects of a respective branch locally or remotely.

26. A rendering system comprising:

a network interface to a network;

a data storage comprising scene descriptor data, wherein the scene descriptor data identifies a set of 3D graphics objects representing at least part of the scene, wherein the scene descriptor data is indicative of changes in a state of the scene over time;

a processor subsystem configured to:

via the network interface, receive a request to render part of the scene, wherein the request comprises a temporal marker which indicates a second time instance which is ahead in time of a first time instance at which the rendering device renders the scene at the time the rendering device determines the temporal marker;

based on the scene descriptor data and the request, render the part of the scene at the state corresponding to the temporal marker to obtain prerendered scene data comprising a prerendered version of the part of the scene;

via the network interface, provide the prerendered scene data to the rendering device.

27. The rendering system according to claim 26, wherein the processor subsystem is further configured to generate metadata comprising respective object identifiers of one or more 3D graphics objects which are prerendered in the prerendered scene data and to provide the metadata with the prerendered scene data to the rendering device.

28. The rendering system according to claim 26, wherein the processor subsystem is further configured to adjust the part of the scene which is requested to be rendered by omitting 3D graphics objects from the rendering based on one of:

a computational load of the remote rendering system;
a latency, bandwidth or reliability, of a network between the rendering device and the remote rendering system.

* * * * *